US012365193B2

(12) United States Patent
Yamaguchi et al.

(10) Patent No.: US 12,365,193 B2
(45) Date of Patent: Jul. 22, 2025

(54) PRINTING APPARATUS AND CONTROL METHOD OF THE SAME

(71) Applicant: CANON KABUSHIKI KAISHA, Tokyo (JP)

(72) Inventors: Hiromitsu Yamaguchi, Kanagawa (JP); Hideki Kubo, Kanagawa (JP); Kouta Murasawa, Kanagawa (JP); Okinori Tsuchiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 238 days.

(21) Appl. No.: 18/122,179

(22) Filed: Mar. 16, 2023

(65) Prior Publication Data

US 2023/0302839 A1 Sep. 28, 2023

(30) Foreign Application Priority Data

Mar. 23, 2022 (JP) ................................ 2022-047349

(51) Int. Cl.
*H04N 1/04* (2006.01)
*B41M 3/06* (2006.01)

(52) U.S. Cl.
CPC .................................... *B41M 3/06* (2013.01)

(58) Field of Classification Search
None
See application file for complete search history.

(56) References Cited

U.S. PATENT DOCUMENTS

| | | | | |
|---|---|---|---|---|
| 7,450,140 B2 * | 11/2008 | Jo | ........................ | H04N 1/2307 347/172 |
| 2022/0250395 A1 * | 8/2022 | Tsuchiya | ................ | B41J 2/2132 |
| 2023/0286288 A1 * | 9/2023 | Mochizuki | ............. | B41J 2/2107 |

FOREIGN PATENT DOCUMENTS

JP 2021-008112 A 1/2021

OTHER PUBLICATIONS

Yugo Mochizuki et al., U.S. Appl. No. 18/118,799, filed Mar. 8, 2023.

* cited by examiner

*Primary Examiner* — Cheukfan Lee
(74) *Attorney, Agent, or Firm* — VENABLE LLP

(57) ABSTRACT

A printing apparatus includes a printing unit including a first printing portion to print an image by a fluorescent coloring material, and a second printing portion to print an image by a second coloring material that is not colored, and a controller to control printing of an image onto a print medium performed by the first printing portion, and printing of an image onto the print medium performed by the second printing portion. The controller controls an order of the printing by the first printing portion and the printing by the second printing portion, in accordance with an attribute of a region of an image as a printing target.

12 Claims, 19 Drawing Sheets

| PROCESSING MEANS | Case1 | Case2 |
|---|---|---|
| KNOCKOUT | (R,G,B,FLUORESCENT P)=(192,64,64,0) | (R,G,B)=(192,64,64) |
| OVERPRINT | (R,G,B,FLUORESCENT P)=(192,64,64,255) | (R,G,B)=(192,64,64) |
| MULTIPLICATION | (R,G,B,FLUORESCENT P)=(0,0,0,0) | (R,G,B)=(96,32,56) |

PRINTING APPARATUS AND CONTROL METHOD OF THE SAME

BACKGROUND OF THE INVENTION

Field of the Invention

The present invention relates to a printing apparatus for printing an image and a control method of the same.

Description of the Related Art

Ink (to be also referred to as "fluorescent ink" hereinafter) using a fluorescent coloring material has a vivid color, and hence is beginning to be used for printing of notices such as posters and POPs and packages of foods and drinks. To further attract attention in such applications, it is important to print an image having higher fluorescence intensity. There is also a need to obtain a printed product having a wide color reproduction range and high chroma with colors that were not conventionally achievable by using fluorescent ink.

To meet these demands, a method of printing an image having a high fluorescence intensity has been proposed (Japanese Patent Laid-Open No. 2021-8112).

Japanese Patent Laid-Open No. 2021-8112 discloses a method in which when performing printing by using fluorescent ink containing a fluorescent dye and clear ink not containing a coloring material and containing a water-soluble organic solvent, the florescent ink and the clear ink are applied such that they at least partially overlap each other on a print medium. This method describes that the fluorescence intensity of an image formed by using the fluorescent ink can be improved.

Japanese Patent Laid-Open No. 2021-8112 describes that the color intensity improves regardless of the order of application of inks, but does not refer to any improvement in color development, particularly chroma. The present inventors made extensive studies and have found that the color development, particularly chroma, improves by application of fluorescent ink and clear ink. More specifically, the present inventors have found that the order of application of fluorescence ink and clear ink produces a difference in the degree of color development. The present inventors further made extensive studies and have confirmed a significant difference in emission intensities.

Notices such as posters are generally contents having both a region (to be also referred to as an "eye-catching area" hereinafter) for attracting attention within an image region to be printed, and a region (to be also referred to as a "bright color area" hereinafter) to be reproduced with brighter colors. An image has both regions for further improving the emission intensity and regions for improving the chroma by widening the color reproduction range. Therefore, if fluorescent ink and clear ink are applied in the same manner to all regions, it is difficult to both improve emission intensity and chroma in the respective regions.

SUMMARY OF THE INVENTION

The present invention provides a printing apparatus capable of improving the emission intensity in a region where it is desirable to improve the emission intensity, and improving the chroma in a region where it is desirable to improve the chroma by extending the color reproduction range, by using fluorescent ink and clear ink.

To achieve the above object, the present invention has the following configuration. According to an aspect of the present invention, provided is a printing apparatus comprising: a printing unit including a first printing portion configured to print an image by a fluorescent material, and a second printing portion configured to print an image by a second coloring material that is not colored; and a controller configured to control printing of an image onto a print medium performed by the first printing portion, and printing of an image onto the print medium performed by the second printing portion, wherein the controller controls an order of the printing by the first printing portion and the printing by the second printing portion, in accordance with an attribute of a region of an image as a printing target.

The present invention can improve the emission intensity in a region where it is desirable to improve the emission intensity, and improve the chroma in a region where it is desirable to improve the chroma by extending the color reproduction range, by using fluorescent ink and clear ink.

Further features of the present invention will become apparent from the following description of exemplary embodiments (with reference to the attached drawings).

DESCRIPTION OF THE EMBODIMENTS

Figure 1:
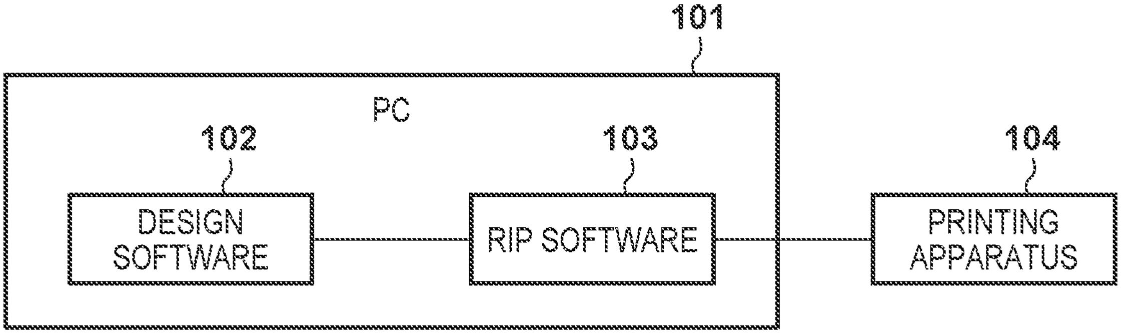
FIG. 1 is a view showing the configuration of a printing system.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

First Embodiment

<Whole Printing System>

FIG. 1 is an example of a printing system applicable to this embodiment. "Printing" herein mentioned is to form an image on a sheet, and can also be called marking. A printing apparatus 104 that functions as an image printing apparatus is connected to a personal computer (PC) 101. The PC 101 has the configuration of a general-purpose computer. The PC 101 includes at least one processor for executing a program, and at least one memory for storing a program such as an application to be executed by the processor, and data or the like to be referred to or processed by executing the program. The PC 101 can also include a storage for storing a file. The PC 101 also includes a display unit and a keyboard or a pointing device for inputting an operation by the user, as devices for providing a user interface (UI). The PC 101 further includes an interface for connecting to an external apparatus such as the printing apparatus 104. The PC 101 can further include a network interface for connecting to a network, and the printing apparatus 104 can be connected to the PC 101 across the network.

In the PC 101, design software 102 as an application can be activated, and image data to be printed by the printing apparatus 104 can be edited. The image data formed by the design software 102 is transferred to RIP software 103. The RIP software 103 performs a plate making process or a color management process.

In FIG. 1, both the design software 102 and the RIP software 103 are executed in the PC 101. However, they may also be executed in another PC. A user who forms and edits image data and a user who executes editing for printing the data on a print medium are often different. In a case like this, the RIP software is executed on a PC of the printing company and a printing apparatus connected to the PC of the printing company is used in many cases. The design software 102 can be, for example, "Illustrator" of Adobe or dedicated software for a specific device, that is, software is not limited. The design software 102 and the RIP software 103 can also be integrated. Also, the RIP software 103 is incorporated into the printing apparatus 104 in some cases. Various communication forms such as USB and Gigabit-Ethernet as wired communication, and Wi-Fi as wireless communication, can be used between the PC 101 and the printing apparatus 104. The communication form leads to the productivity of the printing apparatus, and hence is desirably selectable in accordance with the productivity of the printing apparatus expected by the user.

Figure 2:
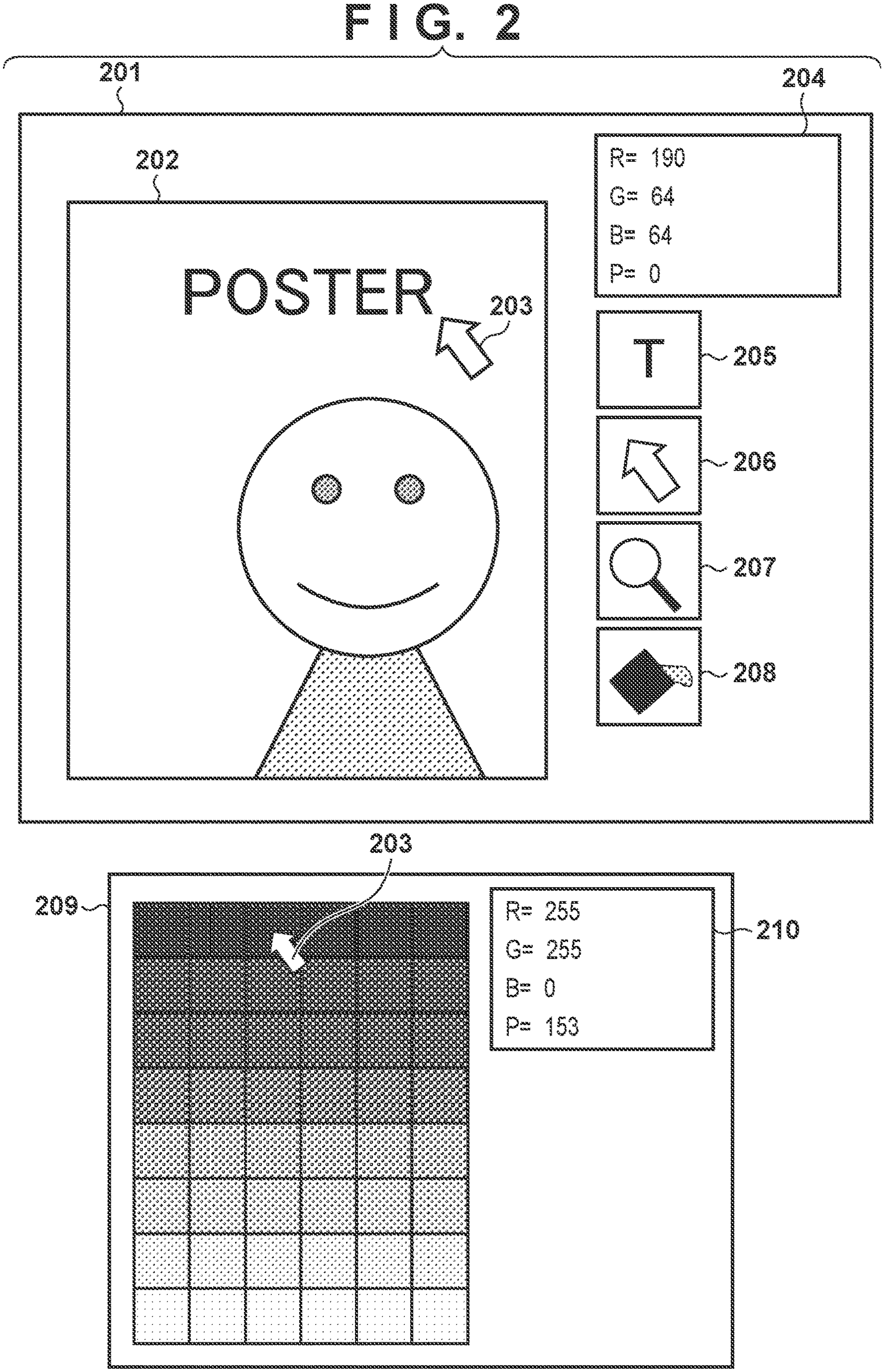
FIG. 2 is a view schematically showing the user interface of design software.

FIG. 2 is an example of a user interface (to be referred to as a UI hereinafter) of the design software 102. A screen 201 shows the whole screen for editing image data. An image 202 displays image data to be edited. A pointer 203 is operated in a window when the user operates a pointing device such as a mouse in order to edit an image by the design software. A pixel value display window 204 is a window for displaying the pixel values of data pointed to by the pointer 203. In FIG. 2, the pointer 203 points to the region of a text "POSTER" on the displayed image 202. This region is drawn by pixels in which the signal values of (R (red), G (green), B (blue), and P (fluorescent pink)) are respectively (190, 64, 64, 0).

A text edit button 205 is a button for superposing text data on image data when performing editing by the design software. By touching the text edit button 205, it is possible to, for example, add the text "POSTER" or change the contents of the text on the image 202.

A pointer change button 206 is a button for changing the pointer 203 to another pointer. The pointer change button 206 can change the pointer 203 to, for example, a rectangular frame for designating a region in the image.

A zoom button 207 is a button for enlarging or reducing an image 202 displayed on the display screen 201. An image to be zoomed is a displayed image and includes a text and a figure.

A color change button 208 is a button for changing pixel value information of data pointed by the pointer 203. When the color change button 208 is touched, a swatch screen 209 is displayed by screen transition or as another screen. When the user designates a patch from the swatch by using the pointer 203, a pixel value window 210 displays pixel value information corresponding to the designated patch. FIG. 2 shows that the signal values of (R, G, B, P) are respectively (255, 255, 0, 153) in the patch pointed to by the pointer 203.

The pixel value information to be displayed on the pixel value windows 204 and 210 is not limited to (R, G, B, P). For example, (C (cyan), M (magenta), Y (yellow), K (black), P) can also be used. It is also possible to use (C, Lc, M, Lm, Y, Ly, K, Lk, P). Lx indicates a color component obtained by decreasing the concentration of a color X. In the case of information other than R, G, and B, given pixel values are not associated with concentrations on a print medium in some cases. That is, pixel values given by RGB are not converted into CMYKP and displayed, but the pixel values themselves are given by CMYKP in some cases. Also, a patch of the swatch expresses a cross patch in which fluorescence P changes its color on the abscissa and R, G, and B change their colors on the ordinate. However, the patch display method shown in FIG. 2 is merely an example, and another display method may also be used. In the swatch patch, the user can manually set a designated value. In this case, the user can designate a patch by the pointer 203 and rewrite a pixel value displayed in the pixel value window 210, thereby manually setting the pixel value, that is, the color of the designated patch. If the user often uses the manually set pixel value, he or she can also preset the value in the swatch. The user can select the concentration of fluorescent pink by using an expression method called the swatch, and can also directly designate the concentration.

The design software 102 transmits image data formed in accordance with an operation by the user to the RIP software 103. In this example shown in FIG. 2, the image data contains data of the color components of four colors (R, G, B, and fluorescent pink). It is also possible to form two or more pages of image data by the design software 102, and transmit the formed two or more pages of image data to the RIP software 103. Assume that the region "POSTER" in the image 202 is superposed on the human face as the background. In this case, image data of the human face and image data of "POSTER" are transmitted to the RIP software 103. The RIP software 103 makes plates of the plurality of transmitted image data, and transfers one image data having undergone the plate making process to the printing apparatus. Note that the image data are counted by the number of corresponding images. That is, image data corresponding to n images are counted as n image data. Also, as described previously, image data formed by the design software includes not only data formed by pixels, but also data to be formed into an image regardless of its format, such as a text or a figure.

Figure 3A:
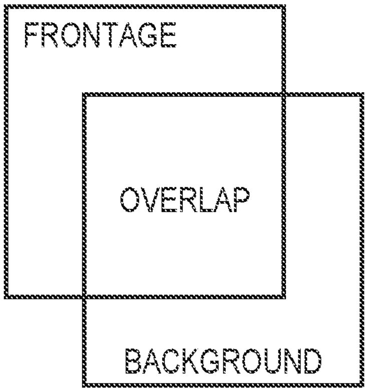
FIGS. 3A and 3B are views showing examples of plate making for data input to RIP software.
Figure 3B:
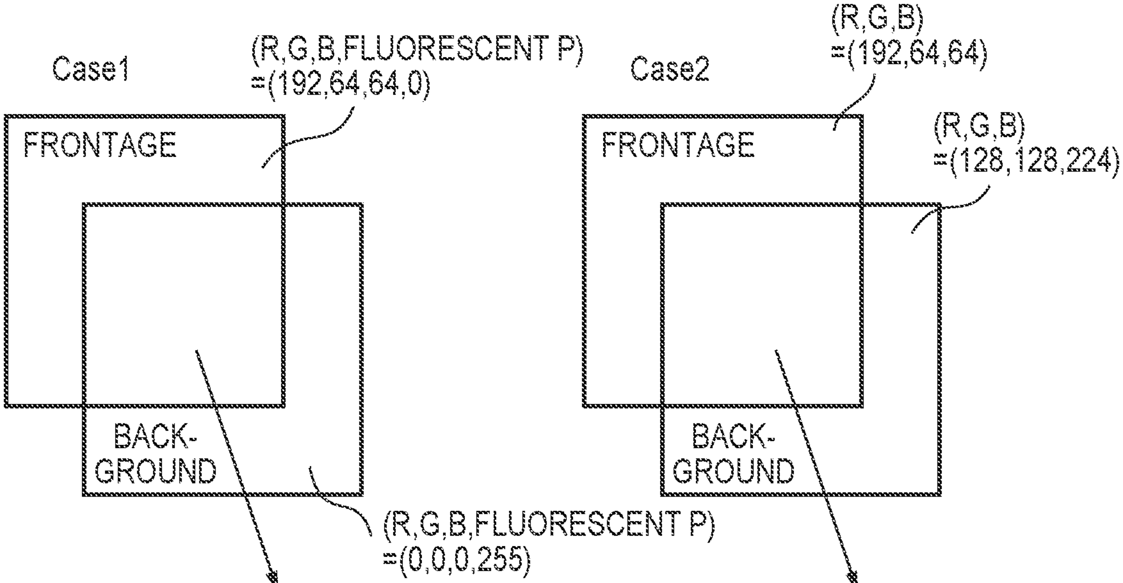

FIGS. 3A and 3B are examples of plate making for data input to the RIP software 103. As shown in FIG. 3A, the upper left rectangle indicates the frontage, the lower right rectangle indicates the background, and the central rectangle indicates an overlapped portion. In the plate making process, one of three processing methods "knockout", "overprint", and "multiplication" is mainly adopted. FIG. 3B shows examples of the plate making process for two cases. In Case 1, RGB data and fluorescent pink data are input. In Case 2, RGB data is input so that a change in means for performing the plate making process is easily understandable. In either case, the plate making process is performed for two image data, that is, a full-screen image and a background image.

Knockout is a processing method of giving priority to the frontage data in all image planes with respect to the overlap of a plurality of image data. "Image plane" is image data of each color component and also called a color plane. In Case 1, if the signal value of fluorescent pink data of the frontage is 0, the overlap region is output as 0 even when the signal value of the background is 255. When the user wants knockout, the purpose is, for example, "to emphasize the frontage data".

Overprint is a processing method of giving priority to the frontage data with respect to overlap, and at the same time adopting the background data when the signal value of an image plane of the frontage data is 0. In Case 1, the signal value of the fluorescent pink data of the frontage is 0, so a signal value of 255 of the background is adopted as the output value of the overlap region. Since other color components in the full-screen image are not 0, their values are similar to those in the case of knockout. When the user wants overprint, the purpose is, for example, "a measure for off-registration".

Multiplication is a processing method of adopting the signal values of the frontage data and the background data with respect to overlap by using a decided equation. This equation changes from one software to another. For example, the output results shown in FIG. 3B were obtained by using equation 1 below:

$$\text{Output signal value}=(1\times\text{frontage data})\times(1\times\text{background data})\div 255 \quad (1)$$

When the user wants multiplication, the purpose is, for example, "a watermark effect".

When using overprint or multiplication, the user intends to make use of the background data instead of overwriting it with the frontage data. Overprint or multiplication is one effective means in a case where the user wants not only the gradations of color ink but also the light emission effect of fluorescent pink ink obtained from fluorescent pink data.

Configuration of Printing Apparatus

Figure 4:
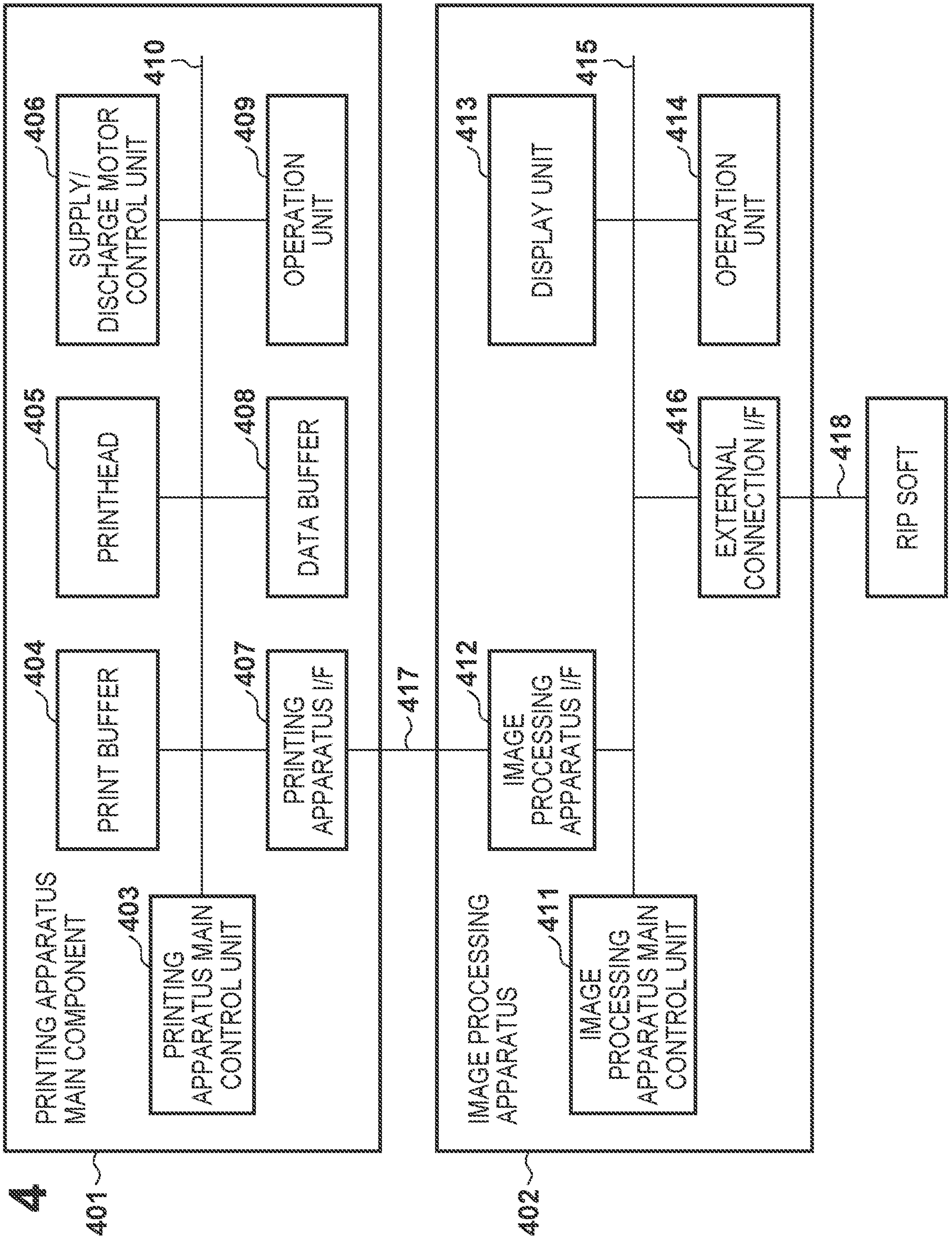
FIG. 4 is a block diagram showing the internal configuration of a printing apparatus.

FIG. 4 is an example of a block diagram showing the internal configuration of the printing apparatus 104. The printing apparatus 104 according to this embodiment includes a printing apparatus main unit 401 and an image processing apparatus (also called an image processor) 402. Image data supplied from the RIP software 103 undergoes predetermined image processing in the image processing apparatus 402. After that, the image data is transmitted to the printing apparatus main unit 401 and printed.

In the printing apparatus main unit 401, a printing apparatus main control unit (also called a printing control unit) 403 controls the whole printing apparatus, and is configured by a CPU, a ROM, a RAM, and the like. Since the CPU can operate a hardware circuit of ASIC, ASIC may also be included as a constituent element. Before image data is transferred to a printhead 405, a print buffer 404 can store the image data as raster data.

The printhead 405 is an inkjet printhead having a plurality of nozzles capable of ejecting ink as droplets, and ejects ink from each nozzle in accordance with the image data stored in the print buffer 404. In this example, nozzle arrays of six colors, that is, cyan, magenta, yellow, black, fluorescent pink, and clear ink are arranged on the printhead 405. However, the number of colors is not limited to this. The fluorescent ink contains a fluorescent dye, and the fluorescent pink contains a pink fluorescent dye. The clear ink does not contain any coloring material but contains a water-soluble organic solvent. That is, the clear ink is not colored. Accordingly, fixed clear ink is transparent and glossy. It is also possible to mount, for example, light cyan ink, light magenta ink, and gray ink in addition to the abovementioned six colors. Furthermore, it is possible to mount red ink, green ink, and blue ink as special color inks, and fluorescent yellow as another fluorescent color ink. Metallic ink and emboss ink having functions other than colors are also mounted in some cases.

A supply/discharge motor control unit 406 conveys a print medium and controls a supply/discharge print medium, and controls the position of a print medium so that ink ejected from the printhead 405 lands on an accurate position of a print medium. Start and stop operations of the motor are performed by taking account of a case in which the printhead 405 has a multipass configuration.

A printing apparatus interface (I/F) 407 exchanges data signals with the image processing apparatus 402. An I/F signal line 417 connects the printing apparatus I/F 407 and the image processing apparatus 402. As a type of the I/F signal line 417, it is possible to apply, for example, a signal line complying with the specification of Centronics. A data buffer 408 temporarily stores image data received from the image processing apparatus 402. An operation unit 409 has a mechanism for performing a command operation by the developer. A system bus 410 connects the various functions of the printing apparatus main unit 401.

On the other hand, in the image processing apparatus 402, an image processing apparatus main control unit (also called an image processing control unit) 411 performs various processes on an image supplied from the RIP software 103, and generates image data printable by the printing apparatus main unit 401. The image processing apparatus main control unit 411 includes a CPU, a ROM, a RAM, and the like. Since the CPU can operate a hardware circuit of ASIC, ASIC may also be included as a constituent element. Lookup tables and matrices to be used are prerecorded in the ROM of the image processing apparatus main control unit 411 in accordance with the types and print modes of print media. An image processing apparatus interface (I/F) 412 exchanges data signals with the printing apparatus main unit 401. An external connection interface (I/F) 416 exchanges image data with an apparatus externally connected by the I/F signal line 417, for example, the PC 101 or a cloud server. In the example shown in FIG. 4, the external connection I/F 416 is connected to the RIP software. However, this means that the external connection I/F 416 is connected to the PC 101 in which the RIP software is installed. A display unit 413 displays various kinds of information to the user, and an LCD or the like is applicable as the display unit 413. An operation unit 414 is a mechanism for performing command operations by the user, and a keyboard, a mouse, or the like is applicable as the operation unit 414. A system bus 415 connects the image processing apparatus main control unit to each function.

Figure 5A:
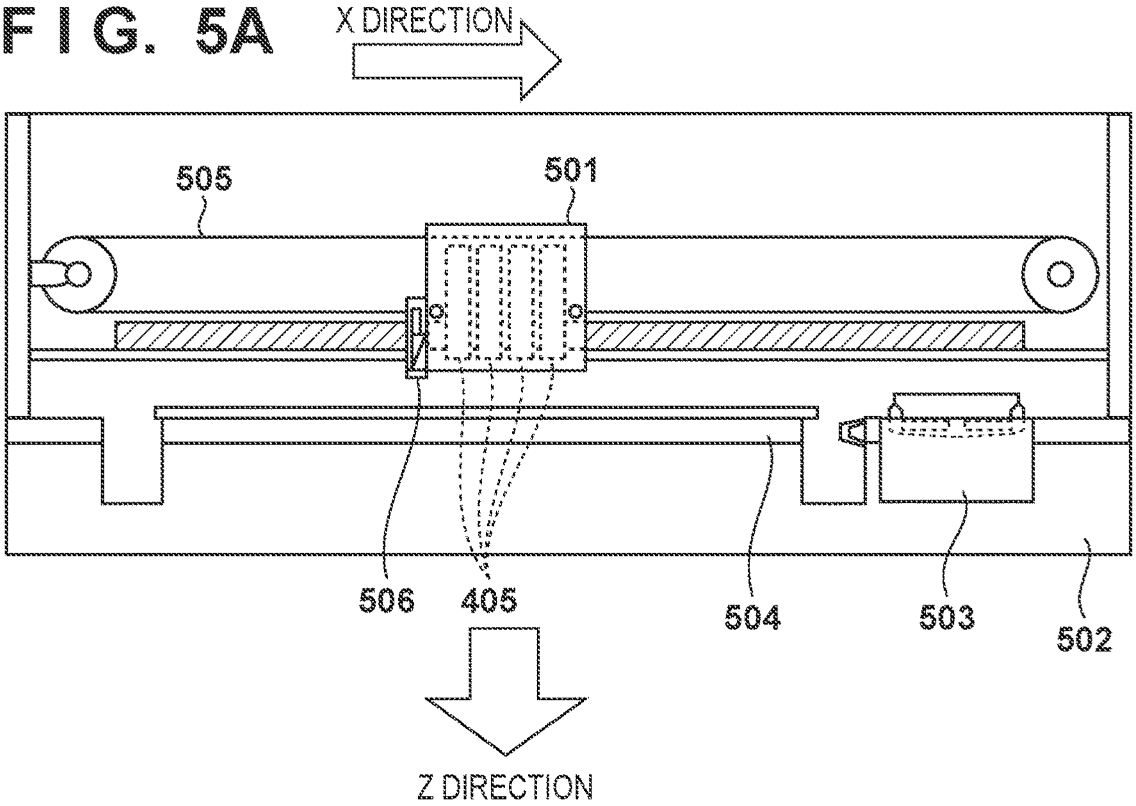
FIG. 5A is a view schematically showing the configuration of a printing unit of the printing apparatus.

FIG. 5A is a view for explaining the configuration of a printing unit of an inkjet printing apparatus usable in this embodiment. A carriage 501 on which the printhead 405 and an optical sensor 506 are mounted can reciprocally move in the X direction shown in FIG. 5A and in the opposite direction by the driving force of a carriage motor transmitted via a belt 505. In the following explanation, the direction indicated by an arrow and the opposite direction will be called the X direction. While the carriage 501 is moving in the X direction relative to a print medium, the printhead 405 ejects ink in the Z direction in accordance with print data, thereby printing an image of one scan on the print medium placed on a platen 504. When this one-time printing scan is completed, the print medium is conveyed by a distance corresponding to the printing width of one scan in the Y direction (a conveyance direction) almost perpendicular to the X direction and the Z direction shown in FIG. 5A. The Y direction is perpendicular to the drawing surface of FIG. 5A. An image is gradually formed on the print medium by alternately repeating the printing scan and the conveyance operation a plurality of times.

The optical sensor 506 detects the print medium on the platen 504 by performing a print medium detecting operation while moving together with the carriage 501. A recovery unit 503 for performing a maintenance process on the printhead is placed in a position outside the platen 504 in the scanning region of the carriage 501.

Figure 5B:
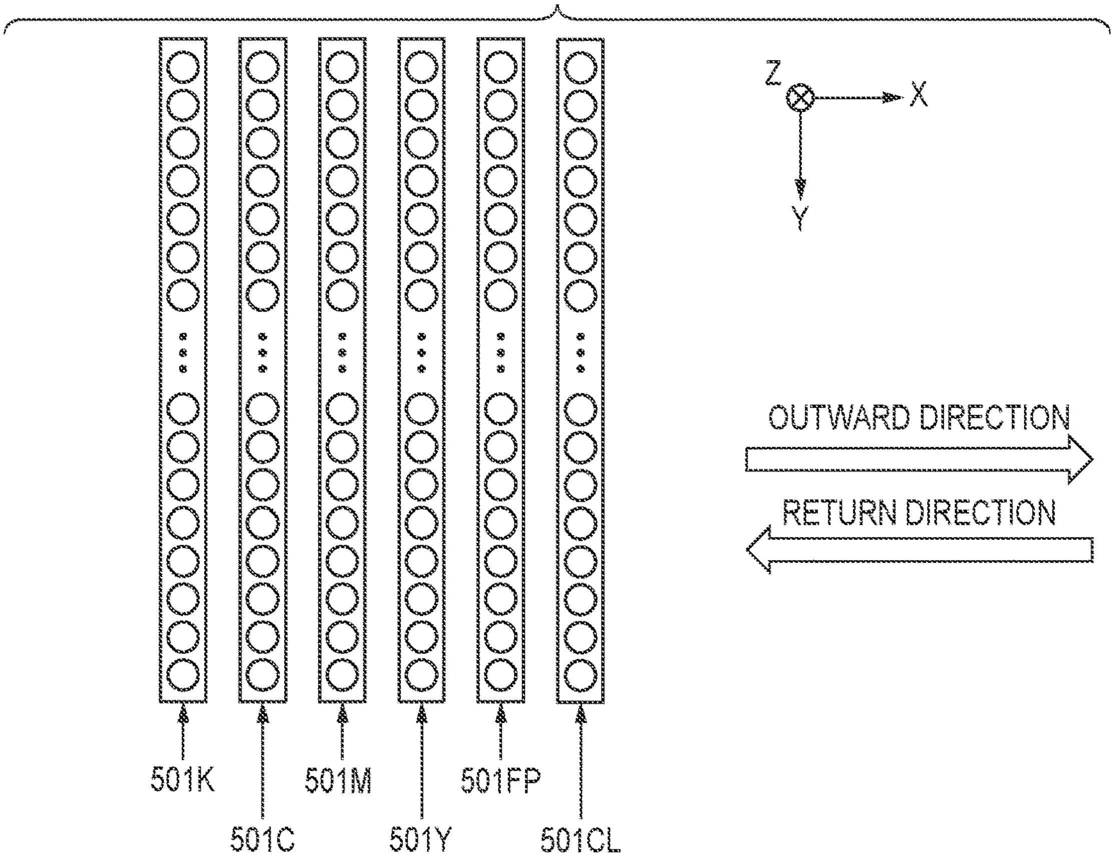
FIG. 5B is a view showing the arrangement of nozzle arrays when a carriage of the printing unit is viewed from the upper surface of the apparatus.

FIG. 5B is a view showing the arrangement of nozzle arrays when the carriage 501 is viewed from the upper surface of the apparatus (in the −Z direction). In the carriage 501, six nozzle arrays are arranged in different positions in the X direction. The six nozzle arrays are a nozzle array 501C corresponding to C ink, a nozzle array 501M corresponding to M ink, a nozzle array 501Y corresponding to Y ink, a nozzle array 501K corresponding to K ink, a nozzle array 501FP corresponding to fluorescent pink ink, and a nozzle array 501CL corresponding to clear ink. Nozzles of the nozzle array 501C eject C ink. Nozzles of the nozzle array 501M eject M ink. Nozzles of the nozzle array 501Y eject Y ink. Nozzles of the nozzle array 501K eject K ink. Nozzles of the nozzle array 501FP eject fluorescent pink ink. Nozzles of the nozzle array 501CL eject clear ink. In each nozzle array, a plurality of nozzles for ejecting ink as droplets are arrayed at a predetermined pitch along the Y direction.

In FIG. 5A, it is assumed that the printhead 405 is a so-called serial type printhead that moves in the X direction. However, the present invention is not limited to this. The printhead can also be a line type printhead using a so-called line head having a head length exceeding the width of a print medium in the X direction. In this case, an image can be formed on a print medium by conveying the print medium for each one-line image formation, without moving the head in the X direction. Even when using the line head, it is desirable to form at least the clear ink head and the fluorescent ink head in different positions in the conveyance direction of a print medium, in order to implement the invention according to this embodiment. It is more desirable to form two fluorescent ink heads of the same color on the two sides of the clear ink head, or to form two clear ink heads on the two sides of the fluorescent ink head.

Figure 6A:
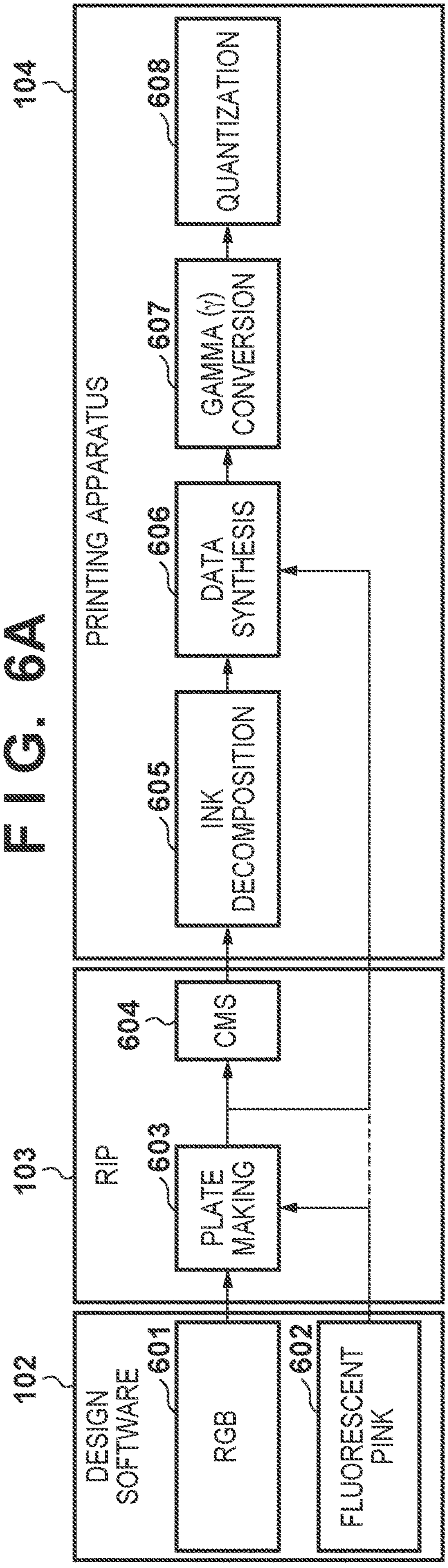
FIGS. 6A and 6B are block diagrams showing processes to be performed by design software, the RIP software, and the printing apparatus.
Figure 6B:
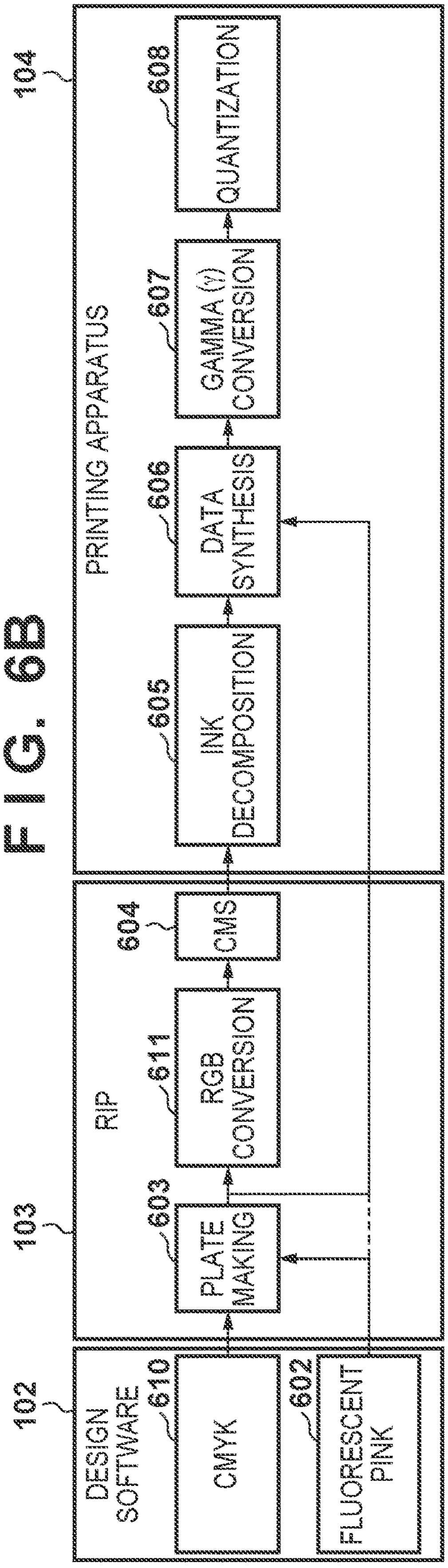

FIGS. 6A and 6B are block diagrams for explaining processes to be performed in the design software 102, the RIP software 103, and the printing apparatus 104. FIGS. 6A and 6B illustrate examples in which processing blocks are different. The design software 102 and the RIP software 103 are software to be executed by the PC 101, but the PC 101 is not shown in FIGS. 6A and 6B. FIG. 6A will be described first. The design software 102 forms RGB data 601 and image data of fluorescent pink data 602, and inputs the data to the RIP software 103. The fluorescent pink data 602 corresponds to the fluorescent pink ink among the inks mounted in the printing apparatus. The user who edits an image by handling the design software 102 designates and inputs the concentration of the fluorescent pink ink on a print medium. As already explained with reference to FIG. 2, the color designation method can be either selection using the swatch or setting of a desired pixel value (of fluorescent pink in this case). By designating fluorescent pink set as the color of a selected region, the region is colored with fluorescent pink.

When the user designates a region to be printed with fluorescent pink ink on an image as described above, the designated region is transmitted as a plane different from other RGB (or CMYK) data to the printing apparatus 104. This data transmitted as the other plane undergoes data processing different from that of normal RGB (or CMYK) data. In this embodiment, an image region that is designated by the user and processed as a plane different from an RGB (or CMYK) image as described above is defined as a special color area. That is, this special color area is a data region that is designated by the user and transmitted as another plane to the printing apparatus. Likewise, in this embodiment, an RGB (or CMYK) image is defined as a normal color area with respect to the special color area. Note that fluorescent pink can also be included in the normal color area and processed, but the fluorescent pink component is designated by the special color area in this embodiment.

A plate making processing unit 603 in the RIP software 103 performs a plate making process on the RGB data 601 and the fluorescent pink data 602. A method of performing the plate making process is the same as explained with reference to FIG. 3B.

A color management system (CMS) 604 in the RIP software 103 performs color management on the RGB data 601. More specifically, the CMS 604 converts the standard RGB data formed by the design software 102 into device RGB data to be expressed by the printing apparatus and a target print medium, thereby decreasing divergence between the appearance on the display of the PC 101 and the appearance of a printed product. The size (range) of a color gamut expressible by the display is larger than that of a printed product (for example, an image formed on a medium). Therefore, the CMS 604 converts the color range from a wide range to a narrow range by using various mapping methods. Examples are a method by which a range exceeding the expression gamut of a printed product is pasted on the gamut limit of the printed product, and a method by which the whole range is so plotted as to be pushed toward the gamut center. In FIG. 6A, it is assumed that input to the CMS 604 is the RGB data 601. The fluorescent pink data 602 is not generally input to the CMS 604, but the fluorescent pink CMS processing is not limited in this embodiment.

The image processing apparatus main control unit 411 shown in FIG. 4 performs each process in the printing apparatus 104. An ink decomposition processing unit 605 performs an ink decomposition process on the RGB data 601 on which color management is executed. The ink decomposition process performs conversion to ink colors of the printhead 405, based on the RGB color distribution. Referring to FIG. 6A, the fluorescent pink data 602 input from the design software 102 to the RIP software 103 already shows the concentration of fluorescent pink ink, and hence is not a processing object of the ink decomposition processing unit 605. When converting the colors of RGB data, however, it is favorable to perform an ink color decomposition process using fluorescent pink ink in order to express a wider color gamut, so the ink color decomposition process is applicable to a plane of fluorescent pink.

In addition, clear ink data generation is also performed in the stage of the ink decomposition process. A clear ink application region is decided, and dot data is generated. In this case, a region in which clear ink is given to the RGB data 601 and a region in which clear ink is given to the fluorescent pink data 602 are decided. FIG. 6A of this embodiment explains this case as an example. On the other hand, clear ink data generation can also be executed after the ink color decomposition processing unit 605. The clear ink data need only be generated so as to correspond to data to be ejected from the printhead.

A data synthesis processing unit 606 synthesizes the data of each color converted by the ink decomposition processing unit 605 and the fluorescent pink data 602 input from the RIP software 103 or data of the same color input from the plate making processing unit 603, and outputs the synthesis result. It is possible to distinguish between the data of each ink color converted by the ink decomposition processing unit 605 and the fluorescent pink data 602 input from the RIP software 103 because these data are input through different paths. The data synthesis processing unit 606 can also be executed after a gamma conversion processing unit 607 and a quantization processing unit 608. Processing to be implemented in this block is to synthesize two fluorescent pink ink data into one data corresponding to the head of the printing apparatus 104. As the synthesizing method, it is possible to use knockout, overprint, or multiplication explained with reference to FIG. 3B, or another means.

In a case in which the ink decomposition processing unit 605 has performed an ink color decomposition process using no fluorescent pink ink, the fluorescent pink data 602 input from the RIP software 103 is the only fluorescent pink data.

Similarly, the data synthesis processing unit 606 can also synthesize clear ink data generated for the RGB data 601 and clear ink data generated for the fluorescent pink data 602, and output the synthesis result. However, to control the application order of fluorescent pink ink and clear ink, clear ink need not be synthesized if unnecessary. Especially in this embodiment, an example in which clear ink data is not synthesized is explained.

The gamma (γ) conversion processing unit 607 performs gradation conversion on the signal value of ink data of each ink to be printed by the printing apparatus 104 by using a gamma curve, thereby linearly associating a change in signal value output from the ink decomposition processing unit 605 with the concentration on a print medium. Ink data can be a value indicating, for example, a concentration to be printed by the corresponding ink. When one ink droplet is ejected to the white background of a print medium, the color abruptly changes with respect to white. On the other hand, a color change is slow even when adding one ink droplet from a state in which several ink droplets are ejected on a print medium. The gamma conversion processing unit 607 gives the gamma curve to a signal value in order to linearly change a visible color change. The ink decomposition processing unit 605 and the gamma conversion processing unit 607 generally perform conversion by using a lookup table, but the present invention is not limited to this. For example, conversion may also be performed by using an equation.

The quantization processing unit 608 converts each ink data having undergone the gamma conversion into dot data. The printing apparatus processing unit expresses a concentration on a print medium by ejecting ink. However, various factors such as the nozzle arrangement density of the printhead, the electric power, ink filling, and the printing productivity required by the user limit the number of dots that can be ejected in, for example, 600 dpi×600 dpi. To express a concentration expressed by the ink data on a print medium, the quantization processing unit 608 disperses dots of each color in 600 dpi×600 dpi in accordance with the concentration. "Area gradation" is implemented by expressing light and shade in 1,200 dpi×1,200 dpi, 2,400 dpi×2,400 dpi, or a wider size. The dot resolution herein described is merely an example, and this embodiment is not limited to this example.

FIG. 6B shows other processing blocks. Differences from FIG. 6A will be explained below. In FIG. 6B, CMYK data 610 is input from the design software 102. An RGB conversion processing unit 611 converts the input CMYK data 610 into RGB data. The RGB conversion processing unit 611 can also be integrated with the CMS 604. Other constituent elements are the same as shown in FIG. 6A.

As shown in FIGS. 6A and 6B, there are two types of input color signals. The two types are color image data such as the RGB data 601 and the CMYK data 610, and image data transmitted by another plane such as the fluorescent pink data 602. In this embodiment, a region on an original image transmitted as color image data is called a normal color area. On the other hand, a region of image data transmitted by another plane is called a special color area. Furthermore, the special color area is a region designated on the original image by the user. That is, FIGS. 6A and 6B show that the procedure of data processing changes in a region on the same image in accordance with whether the region is designated by the user. In either of the configurations shown in FIGS. 6A and 6B, the printing apparatus 104 performs conversion into dot data as ink ejection data of an output color as a result of final quantization.

Note that this embodiment uses clear ink in image printing, and the data of clear ink is generated by the printing apparatus 104 in accordance with image data and printed on a medium in addition to inks of other colors.

<Fluorescent Ink Characteristics and Subtractive Mixture Ink>

Figure 7:
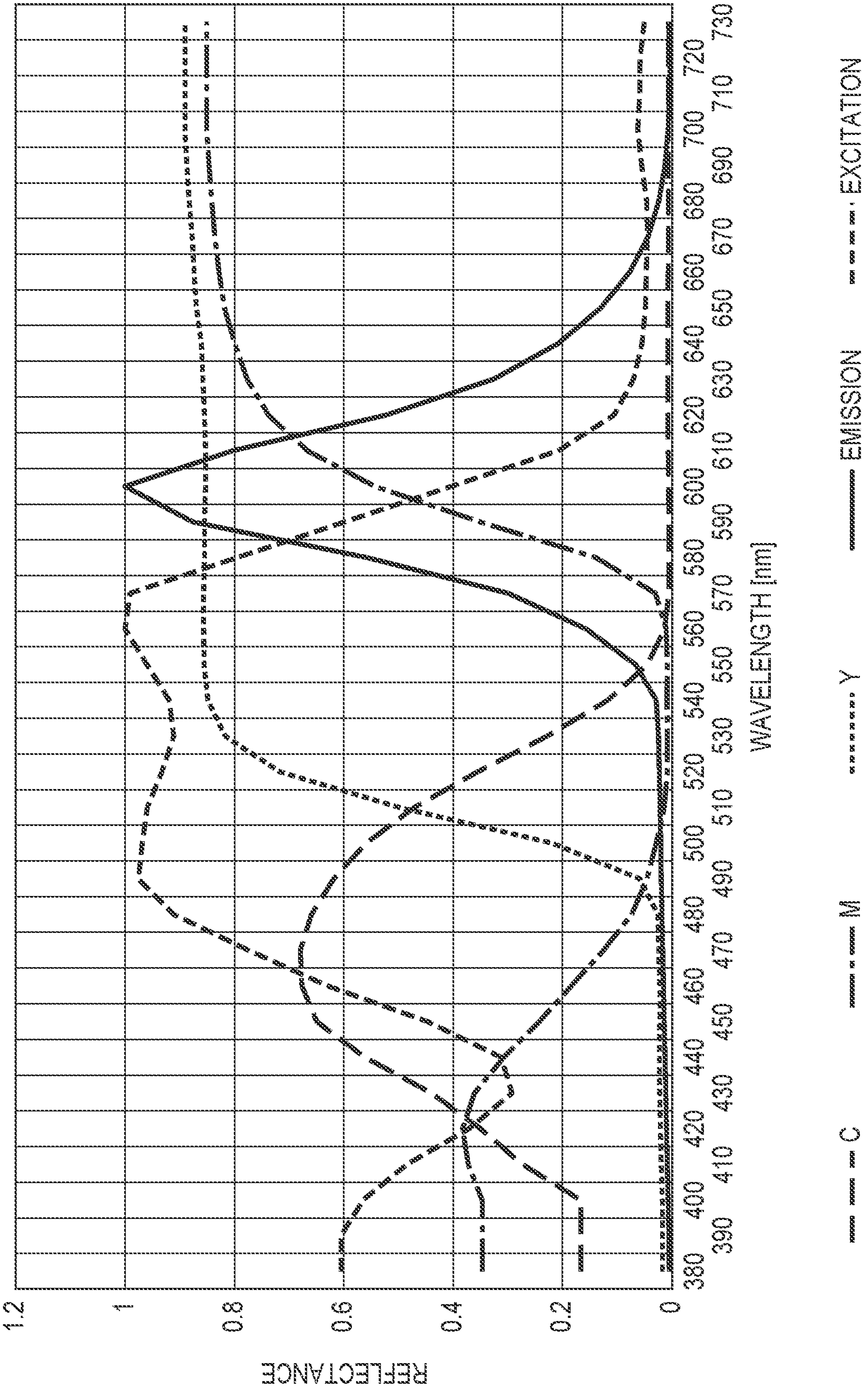
FIG. 7 is a view showing the intensity of excitation and the intensity of emission when printing fluorescent pink ink on a print medium.

A fluorescent coloring material is a coloring material changes from a ground state to an excitation state by absorbing light at an excitation wavelength, and returns to the ground state by emitting light at an emission wavelength, thereby generating a color. FIG. 7 is a graph showing the intensity of excitation 701 and the intensity of emission 702 when fluorescent pink ink was printed on a print medium. In this graph shown in FIG. 7, the wavelength of light is plotted on the abscissa, and the intensity of light is plotted on the ordinate. This graph shows the intensity of light when detecting the wavelength of light emitted to a print sample and the wavelength of light received from the print sample while changing the wavelengths.

The emission 702 represents the intensity of light received from the print sample for each wavelength, when the print sample was irradiated with light having the excitation wavelength. More specifically, the emission 702 represents the intensity of light received from the print sample for each wavelength, when the print sample was irradiated with light at 480 nm with respect to fluorescent pink of this embodiment. The excitation 701 represents the intensity of received light when the wavelength of light to be received was fixed and the wavelength of light to be emitted to the print sample was changed. As shown in FIG. 7, the wavelength region in which fluorescent ink printed on the print medium excites overlaps the emission wavelength region and exists on a short-wavelength side. Also, the excitation 701 increases or decreases for each wavelength, and has a wavelength that efficiently emits light and a wavelength that does not. In addition, since a fluorescent coloring material emits light, the reflectance at the emission wavelength often exceeds 1. In this embodiment, a coloring material having the characteristics as described above is defined as a fluorescent coloring material.

The excitation and light emission of fluorescent pink have been explained above. In this embodiment, however, it is also possible to use fluorescent ink that emits light at another wavelength. For example, it is possible to use fluorescent blue that emits light in a blue region (450 to 500 nm), or fluorescent green that emits light in a green region (500 to 565 nm). Furthermore, it is possible to use fluorescent yellow that emits light in a yellow region (565 to 590 nm), or fluorescent orange or fluorescent red that emits light in a red region (590 to 780 nm). It is also possible to use fluorescent ink obtained by combining the above-described inks. An example is fluorescent yellow combining light emission in the yellow region and the red region. It is further possible to adjust the color tone by combining fluorescent inks different in intensity of the excitation wavelength. An example is fluorescent pink that weakly excites in the blue region and strongly excites in the green region, and emits light in the orange region.

In this embodiment, subtractive mixture ink is defined as ink containing a coloring material that absorbs light having a predetermined specific wavelength, among light components emitted to the ink, and does not emit that light. For example, the subtractive mixture ink has spectral reflectances of cyan (C) 703, magenta (M) 704, and yellow (Y) 705 shown in FIG. 7. The graph of FIG. 7 was obtained by measurement using a well-known spectral reflectance measuring method. This embodiment describes an example using black (K) ink, and black (K) is also included in the subtractive mixture ink. The subtractive mixture ink only absorbs light, unlike fluorescent ink, so the reflectance does not exceed 1.

Next, mixing colors of fluorescent ink and subtractive mixture ink on a print medium will be explained with reference to FIG. 7. When fluorescent pink and yellow are mixed, yellow absorbs light in the wavelength region of the excitation 701 of fluorescent pink. Consequently, fluorescent pink cannot sufficiently excite because yellow absorbs the excitation light, so light emission is suppressed. When fluorescent pink and the cyan 703 are mixed, cyan absorbs light in the wavelength region of the emission 702 of fluorescent pink. Therefore, the cyan ink absorbs light emitted by fluorescent pink, so the emitted light is suppressed. When fluorescent pink and the magenta 704 are mixed, light having a high excitation sensitivity of fluorescent pink is absorbed, and emitted light is also absorbed. That is, when fluorescent pink and the subtractive mixture ink are mixed, the contribution ratio of fluorescent pink to color generation significantly decreases.

Figure 8:
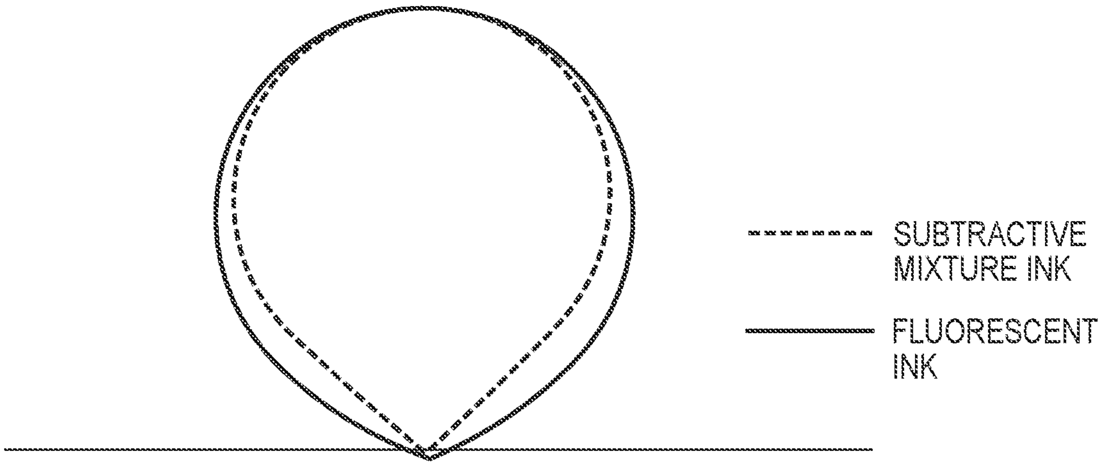
FIG. 8 is a view schematically showing the gonio-spectral reflectance of fluorescent ink and subtractive mixture ink.

The gonio-spectral reflectance of fluorescent ink and subtractive mixture ink will be explained with reference to FIG. 8. FIG. 8 schematically represents bidirectional reflectance distribution functions for the gonio-spectral reflectance of fluorescent ink indicated by the solid line, and that of subtractive mixture ink indicated by the broken line. A method of measuring the gonio-spectral reflectance can be a well-known method. A known example is a method of vertically emitting light to a sample printed on a print medium and detecting received reflected light by changing an angle. As shown in FIG. 8, the gonio-spectral reflectance of fluorescent ink isotropically scatters light compared to that of subtractive mixture ink. This is so because fluorescent ink excites by absorbing light and emits light, so the incident light loses its directionality and strongly depends on the directionality of the light emitted by fluorescent ink. Accordingly, it is found through this experiment that fluorescent ink strongly scatters light compared to subtractive mixture ink.

<Fluorescent Ink and Clear Ink>

Fluorescent ink and clear ink to be used in this embodiment will be explained below. The fluorescent ink of this embodiment preferably contains resin particles dyed by a fluorescent dye.

(Fluorescent Ink)

[Fluorescent Dye]

The fluorescent ink contains a coloring material containing a fluorescent dye. The fluorescent ink preferably contains resin particles dyed by the fluorescent dye. Examples of the fluorescent dye are C.I. Basic Red: 1, 1:1, 2, 4, 8, 11, 12, and 13; Rhodamine: 19 and 575; C.I. Acid Red 52; C.I. Solvent Red: 43, 44, 45, 49, and 149; C.I. Disperse Red: 58 and 60; C.I. Basic Violet: 1, 3, 10, 11, 11:1, and 14; C.I. Basic Blue 7: C.I. Basic Green 1; C.I. Basic Yellow: 1, 2, 9, 13, 24, 37, 40, and 96; C.I. Solvent Yellow: 7, 43, 44, 85, 98, 131, 160:1, 172, and 196; C.I. Disperse Yellow: 82 and 186; C.I. Solvent Orange: 5, 45, 63, and 115; C.I. Disperse Orange 11; and C.I. Fluorescent Brightener: 9, 24, 28, 32, 52, 71, 134, 140, 154, 205, 220, 260, 351, and 363.

Of these dyes, C.I. Basic Red 1, C.I. Basic Red 1:1, C.I. Basic Violet 11, C.I. Basic Violet 11:1, C.I. Basic Yellow 40; C.I. Solvent Yellow 160:1, C.I. Solvent Yellow 196, C.I. Disperse Yellow 82, and C.I. Fluorescent Brightener 351 are particularly favorable from the viewpoints of the color development and stability of the dye.

The fluorescent ink can contain two or more types of fluorescent dyes as coloring materials. The content (mass %) of the fluorescent dye in the fluorescent ink is preferably 0.1 mass % or more to 5.0 mass % or less based on the total mass of the ink.

[Resin Particles]

The fluorescent ink preferably contains resin particles dyed by the above-described fluorescent dyes. In this specification, "resin particles" means a resin dispersed in an aqueous medium and capable of existing in the aqueous medium in a state in which the resin has a particle size. Accordingly, the resin particles exist in a state in which they are dispersed in ink, that is, in the state of a resin emulsion.

The resin particles are preferably formed by a resin having a polar group or an aromatic group and having high affinity to the fluorescent dyes. Examples of the resin are an acrylic resin, a urethane-based resin, and an olefin-based resin. An acrylic resin and a urethane-based resin are more favorable, and an acrylic resin is most favorable.

As the resin particles, it is possible to use resin particles having a so-called core-shell structure having a core portion and a shell portion covering the core portion. In the case of resin particles having the core-shell structure, the fluorescent dye is preferably mainly contained in the core portion.

The shell portion has a function of suppressing elution of the fluorescent dye from the core portion, and a function of improving the dispersion stability of the resin particles in the ink.

The core portion preferably contains an aromatic group-containing unit and a cyano group-containing unit as constituent units. When the core portion contains the aromatic group-containing unit and the cyano group-containing unit, an interaction occurring between the fluorescent dye and the resin particles increases. This makes it possible to efficiently dye the resin particles with the fluorescent dye.

The shell portion preferably contains an aromatic group-containing unit, an anionic group-containing unit, and a unit deriving from a crosslinking agent. When the shell portion contains the aromatic group-containing unit, a hydrophobic interaction and a π-π interaction occur between this unit and the aromatic group of the core portion. Consequently, the shell portion hardly comes off from the core portion, and the cyano group of the core portion is hardly exposed to the surfaces of the resin particles. This makes it possible to prevent elution of the fluorescent dye that dyes the resin particles, and suppress decrease of the fluorescence intensity. The aromatic group-containing unit contained in the core portion and the aromatic group-containing group contained in the shell portion are favorably units of the same kind. "Units of the same kind" means units deriving from the same monomer. When the aromatic group-containing unit contained in the core portion and the aromatic group-containing group contained in the shell portion are units of the same kind, the core-shell interaction is further enhanced, so the decrease of the fluorescence intensity can further be suppressed.

A monomer that forms the aromatic group-containing unit by polymerization preferably has one polymerizable functional group such as an ethylenic unsaturated bond in a molecule. Practical examples are styrene, vinyltoluene, p-fluorostyrene, p-chlorostyrene, α-methylstyrene, 2-vinylnaphthalene, 9-vinylanthracene, 9-vinylcarbazole, phenyl (meth)acrylate, benzyl (meth)acrylate, 2-phenoxyethyl (meth)acrylate, 2,4-diamino-6-((meth)acryloyloxy)ethyl-1,3,5-triazine, 2-naphthyl (meth)acrylate, 9-anthryl (meth) acrylate, and (1-pyrenyl)methyl (meth)acrylate.

The monomer that forms the aromatic group-containing unit by polymerization is preferably a monomer having neither an anionic group nor a cyano group or a monomer having a molecular weight of 300 or less are favorable, and more preferably a monomer having a molecular weight of 200 or less. Of these monomers, styrene and its derivative are further favorable, and styrene and vinyltoluene are particularly favorable, because the reactivity of polymerization is high and the stability of the obtained resin particles is also high.

The monomer that forms a cyano group-containing unit by polymerization is preferably a monomer having one polymerizable functional group such as an ethylenic unsaturated bond in a molecule. Practical examples are acrylonitrile, methacrylonitrile, chloroacrylonitrile, and 2-cyanoethyl (meth)acrylate.

The monomer that forms the cyano group-containing unit by polymerization is preferably a monomer having neither an anionic group nor an aromatic group or a monomer having a molecular weight of 300 or less, and more preferably a monomer having a molecular weight of 200 or less. Acrylonitrile and methacrylonitrile are particularly favorable because the reactivity of polymerization is high.

The anionic group in the anionic group-containing unit preferably has one polymerizable functional group such as an ethylenic unsaturated bond in a molecule. Practical examples are a carboxylic acid group, a phenolic hydroxy group, and a phosphoric ester group. A carboxylic acid group is particularly favorable because the stability of resin particles in ink is high. Examples of the monomer that forms an anionic group-containing unit are (meth)acrylic acid, p-vinyl benzoic acid, 4-vinyl phenol, β-carboxyethyl (meth) acrylate, phosphoric (methacrylic acid-2-hydroxyethyl)ester, 2-hydroxyethyl (meth)acrylate, and 3-hydroxypropyl (meth)acrylate. The monomer that forms an anionic group-containing unit by polymerization is preferably a monomer having neither an aromatic group nor a cyano group or a monomer having a molecular weight of 300 or less, and more preferably a monomer having a molecular weight of 200 or less. Of these monomers, (meth)acrylic acid is particular favorable. The anionic group in the anionic group-containing unit is preferably a carboxylic acid group alone. The anionic group is either an acid type or a salt type. When the anionic group is a salt type, the state of the group can be either a partially dissociated state or an entirely dissociated state. When the anionic group is a salt type, examples of a cation as a counter ion are an alkali metal cation, ammonium, and organic ammonium.

As the crosslinking agent that forms a unit deriving from the crosslinking agent, at least one type need only be used, and it is favorable to use two or more types of crosslinking agents. When the crosslinking agent includes two or more types of crosslinking agents, at least one type of a crosslinking agent is preferably a crosslinking agent having a glycidyl group. This crosslinking agent having a glycidyl group crosslinks by reacting with an anionic group such as a carboxylic acid group existing in the shell portion. This makes it possible to prevent elution of the fluorescent dye, and suppress the decrease of the fluorescence intensity. Furthermore, the use of two or more types of crosslinking agents can form a tight crosslinking structure capable of efficiently suppressing excess increase of the hydrophilicity of the shell portion.

An example of the crosslinking agent that forms a unit deriving from the crosslinking agent by polymerization is a compound having two or more polymerizable functional groups such as ethylenic unsaturated bonds in a molecule. Examples of this crosslinking agent are diene compounds such as butadiene and isoprene;

bifunctional (meth)acrylate such as 1,4-butanediol di(meth)acrylate, 1,9-nonanediol di(meth)acrylate, (mono-, di-, tri-, poly-)ethylene glycol (meth)acrylate, (mono-, di-, tri-, poly-)propylene glycol (meth)acrylate, (mono-, di-, tri-, poly-)tetramethylene glycol (meth) acrylate, ethylene oxide modified bisphenol A di(meth) acrylate, 2-hydroxy-3-(meth)acryloyloxy propyl methacrylate, propoxylated ethoxylated bisphenol A di(meth)acrylate, ethoxylated bisphenol A di(meth) acrylate, 9,9-bis(4-(102-(meth)acryloyloxy ethoxy) phenyl)fluorene, tricyclodecane dimethanol di(meth) acrylate, 1,10-decanediol di(meth)acrylate, 1,6-hexanediol di(meth)acrylate, neopentyl glycol di(meth) acrylate, tricyclodecane dimethanol di(meth)acrylate, ethoxylated polypropylene glycol di(math)acrylate, and glycerin di(meth)acrylate;

trifunctional (meth)acrylate such as tris(2-(meth)acryloyloxyethyl)isocyanurate, trimethylolpropane tri(meth) acrylate, tris(2-hydroxyethyl)isocyanurate tri(meth) acrylate, ethoxylated trimethylolpropane tri(meth) acrylate, pentaerythritol tri(meth)acrylate, propoxylated trimethylolpropane tri(meth)acrylate, propoxylated glyceryl tri(meth)acrylate, ethoxylated isocyanurate tri(meth)acrylate, ε-caprolactone modified tris-(2-(meth)acryloyloxyethyl)isocyanurate, and ethyleneoxide modified trimethylolpropane di(meth) acrylate;

tetrafunctional (meth)acrylate such as ditrimethylolpropane tetra(meth)acrylate, ethoxylated pentaerythritol tetra(meth)acrylate, and pentaerythritol tetra(meth) acrylate; and divinyl benzene.

The crosslinking agent preferably has a molecular weight exceeding 200, more preferably has a molecular weight exceeding 300, and particularly preferably has a molecular weight of 400 or more. Also, the crosslinking agent is preferably a compound having two ethylenic unsaturated bonds in a molecule. By using a compound having two ethylenic unsaturated bonds in a molecule, it is possible to suppress aggregation of resin particles caused by excess crosslinking, and obtain resin particles having more uniform particle sizes. Of compounds having two ethylenic unsaturated bonds in a molecule, divinylbenzene and ethylene glycol di(meth)acrylate are more favorable.

Examples of the crosslinking agent having a glycidyl group are ethylene glycol diglycidyl ether, polyethylene glycol diglycidyl ether, sorbitol polyethylene glycol diglycidyl ether, glycerol polyglycidyl ether, diglycerol polyglycidyl ether, polyglycerol polyglycidyl ether, pentaerythritol polyglycidyl ether, propylene glycol diglycidyl ether, polypropylene glycol diglycidyl ether, trimethylolpropane polyglycidyl ether, and neopentyl glycol diglycidyl ether. Ethylene glycol glycidyl ether is particularly favorable because a high-density crosslinking structure can be formed and the effect of suppressing excess rise of the hydrophilicity of the shell portion is large.

A surfactant can be used in the manufacture of resin particles. It is favorable to manufacture resin particles in the presence of a surfactant because the particle size and shape of the obtained resin particles are easily stabilized. However, a non-reactive surfactant easily peels off from the resin particles in some cases. If the surfactant peels off in ink, the resin particles easily aggregate and concentration quenching becomes difficult to suppress in some cases. Accordingly, a surfactant to be used in the manufacture of resin particles is preferably a reactive surfactant. Note that as will be described later, concentration quenching is a phenomenon in which when the concentration of fluorescent ink rises to a certain degree or more, the fluorescence intensity of an image printed by the fluorescent ink decreases instead of increasing.

As the reactive surfactant, it is favorable to use a compound in which a polymerizable functional group such as a (meth)acryloyl group, a maleyl group, a vinyl group, or an allyl group bonds to the interior or end of a molecule formed by a hydrophilic portion and a hydrophobic portion. Examples of the hydrophilic portion are polyoxy alkylene chains such as an ethylene oxide chain and a propylene oxide chain. Examples of the hydrophobic portion are alkyl, aryl, and a structure combining them. The hydrophilic group and the hydrophobic group can link to each other via a linking group such as an ether group. The reactive surfactant preferably has a molecular weight exceeding 200, more preferably has a molecular weight exceeding 300, and particularly preferably has a molecular weight of 400 or more.

Practical examples of the reactive surfactant are polyoxyethylene nonyl propenyl phenyl ether, polyoxyethylene nonyl propenyl phenyl ether ammonium sulfate, polyoxyethylene-1-(allyloxymethyl)alkyl ether ammonium sulfate, α-hydro-ω-(1-alkoxymethyl-2-(2-propenyloxy)ethoxy)-poly(oxy-1,2-ethanedily)), α-[1-[(allyloxy)methyl]-2-(nonylphenoxy)ethyl]-ω-hydroxypolyoxyethylene, α-sulfo-ω-(1-alkoxymethyl-2-(2-propenyloxy)ethoxy)-poly(oxy-1,2-ethanediyl)ammonium salt, 2-sodiumsulfoethyl methacrylate, bis(polyoxyethylene polycyclic phenyl ether) methacrylate sulfate salt, alkoxy polyethylene glycol methacrylate, alkoxy polyethylene glycol maleate, polyoxy alkylene alkenyl ether, polyoxy alkylene alkenyl ether ammonium sulfate, vinyl ether alkoxylate, alkylallylsulfo succinate, polyoxy alkylene methacrylate sulfate salt, and unsaturated phosphate. Of these surfactants, α-sulfo-ω-(1-alkoxymethyl-2-(2-propenyloxy)ethoxy)-poly(oxy-1,2-ethanediyl)ammonium salt (for example, ADEKA REASOAP SR-10S, SR-10, SR-20, SR-3025, SE-10N, and SE-20N manufactured by ADEKA) is particularly favorable.

The core portion and shell portion of the resin particle can contain a unit other than the abovementioned units unless the effects of this embodiment are ruined. This unit other than the abovementioned units is preferably a unit having one polymerizable functional group in a molecule. A practical example is a unit deriving from an ethylenic unsaturated monomer.

Examples of the ethylenic unsaturated monomer are alkene such as ethylene and propylene; alkyl (meth)acrylate such as methyl (meth)acrylate, ethyl (meth)acrylate, butyl (meth)acrylate, lauryl (meth)acrylate, and hexadecyl (meth) acrylate; monocyclic (meth)acrylates such as cyclopropyl (meth)acrylate, cyclohexyl (meth)acrylate, cyclooctyl (meth)acrylate, and cyclodecyl (meth)acrylate;

bicyclic (meth)acrylates such as isobornyl (meth)acrylate and norbornyl (meth)acrylate;

tricyclic (meth)acrylates such as adamantyl (meth)acrylate, dicyclopentanyl (meth)acrylate, and dicyclopentenyl oxyethyl (meth)acrylate; and nonionic hydrophilic group-containing (meth)acrylates such as methoxy(mono, di, tri, poly)ethylene glycol (meth)acrylate.

The ethylenic unsaturated monomer is preferably a monomer having none of an anionic group, a cyano group, and an aromatic group or a monomer having a molecular weight of 300 or less, and more preferably a monomer having a molecular weight of 200 or less. In particular, alkene having 1 or more to 22 or less carbon atoms and alkyl (meth) acrylate in which an alkyl group has 1 or more to 22 or less carbon atoms are favorable.

Also, alkyl (meth)acrylate in which an alkyl group has 1 or more to 12 or less carbon atoms is more favorable, and methyl (meth)acrylate and ethyl (meth)acrylate are particularly favorable, because it is possible to easily adjust the physical properties of resin particles and obtain resin particles having high polymerization stability.

As described above, the core portion preferably includes the aromatic group-containing unit and the cyano group-containing unit. The ratio (mass %) of the aromatic group-containing unit in the core portion is preferably 25 mass % or more to 90 mass % or less, and more preferably 35 mass % or more to 90 mass % or less. The ratio (mass %) of the cyano group-containing unit in the core portion is preferably 10 mass % or more to 60 mass % or less, and more preferably 20 mass % or more to 55 mass % or less. The ratio (mass %) of other units in the core portion is preferably 15 mass % or less. "Other units" in the core portion are units other than the aromatic group-containing unit and the cyano group-containing unit. "Other units" in the core portion preferably include a unit deriving from a reactive surfactant. Also, the core portion is preferably not crosslinked. That is, "other units" in the core portion preferably do not include any unit deriving from a crosslinking agent.

As described above, the shell unit preferably includes an aromatic group-containing unit, an anionic group-containing unit, and a unit deriving from a crosslinking agent. The ratio (mass %) of the aromatic group-containing unit in the shell portion is preferably 1 mass % or more to 60 mass % or less, and more preferably 10 mass % or more to 50 mass % or less. The ratio (mass %) of the anionic group-containing unit in the shell portion is preferably 5 mass % or more to 30 mass % or less, and more preferably 10 mass % or more to 20 mass % or less. The ratio of the unit deriving from a crosslinking agent in the shell portion is preferably 30 mass % or more to 80 mass % or less, and more preferably 40 mass % or more to 70 mass % or less. The ratio (mass %) of other units in the shell portion is preferably 10 mass % or less, and more preferably 5 mass % or less. "Other units" in the shell portion are units other than the aromatic group-containing unit, the anionic group-containing unit, and the unit deriving from a crosslinking agent. "Other units" in the shell portion preferably include a unit deriving from a reactive surfactant.

The ratio (mass %) of the fluorescent dye in the resin particle is preferably 1.0 mass % or more to 15.0 mass % or less, and more preferably 4.0 mass % or more to 8.0 mass % or less. As the mass ratio of the core portion and the shell portion in the resin particle, the core portion:shell portion is preferably 50:50 to 95:5, and more preferably 60:40 to 90:10, when the total mass ratio is 100. The content (mass %) of first resin particles in ink is preferably 1.0 mass % or more to 10.0 mass % or less based on the total ink mass.

[Manufacturing Method of Resin Particles]

The resin particles can be manufactured in accordance with conventionally known methods such as emulsion polymerization, miniemulsion polymerization, seed polymerization, and phase-transfer emulsification. Of these methods, emulsion polymerization and seed polymerization are favorable because resin particles having a more uniform size can be manufactured. It is possible to further stabilize the ink ejection performance of an inkjet system by using resin particles having a more uniform particle size.

Examples of a method of dyeing resin particles are a method of forming resin particles by polymerizing a monomer mixture in which a fluorescent dye is dissolved; and a method of adding a fluorescent dye to resin particles and heating the resultant material. In particular, the method of adding a fluorescent dye to resin particles and heating the resultant material is favorable because the method is applicable to many types of fluorescent dyes. Note that when heating the material, it is not favorable to add any dyeing assistant (for example, a water-soluble resin or a surfactant). If a water-soluble resin is used as a dyeing assistant, the water-soluble resin forms a film and obstructs redispersion of the resin particles in some cases, and this sometimes slightly decreases the adhesion recovery performance. Also, if a surfactant is used as the dyeing assistant, the physical properties of ink are affected and the ejection performance of ink slightly decreases in some cases.

(Clear Ink)

[Water-Soluble Organic Solvent]

Clear ink is ink not containing any coloring material and containing a water-soluble organic solvent. Practical examples of the water-soluble organic solvent are monovalent alcohols having 1 to 4 carbon atoms such as methyl alcohol, ethyl alcohol, n-propyl alcohol, isopropyl alcohol, n-butyl alcohol, sec-butyl alcohol, and tert-butyl alcohol; divalent alcohols such as 1,2-propanediol, 1,3-butanediol, 1,4-butanediol, 1,5-pentanediol, 1,2-hexanediol, 1,6-hexanediol, 2-methyl-1,3-propanediol, and 3-methyl-1,5-pentanediol;

- polyvalent alcohols such as 1,2,7-heptanetriol, 1,2,6-hexanetriol, glycerin, trimethylol propane, and trimethylol ethane;
- alkylene glycols such as ethylene glycol, diethylene glycol, triethylene glycol, tetraethylene glycol, butylene glycol, hexylene glycol, and thiodiglycol;
- glycol ethers such as ethylene glycol monomethyl ether, diethylene glycol monomethyl ether, diethylene glycol monoethyl ether, triethylene glycol monoethyl ether, and triethylene glycol monobutyl ether;
- polyalkylene glycols having a number-average molecular weight of 200 to 1,000, such as polyethylene glycol having a number-average molecular weight of 600, polyethylene glycol having a number-average molecular weight of 1,000, and polypropylene glycol;
- nitrogen-containing compounds such as 2-pyrolidone, N-methyl-2-pyrolidone, 1,3-dimethyl-2-imidazolidinone, N-methyl morpholine, urea, ethylene urea, and triethanol amine; and
- sulfur-containing compounds such as dimethyl sulfoxide and bis(2-hydroxyethylsulfone).

The content (mass %) of the water-soluble organic solvent in the clear ink is preferably 1.0 mass % or more to 25.0 mass % or less, and more preferably 3.0 mass % or more to 20.0 mass % or less, based on the total ink mass. The clear ink can contain two or more types of water-soluble organic solvents.

The content (mass %) of the water-solution organic solvent in the clear ink is preferably 1.0 time or more as a mass ratio to the content (mass %) of resin particles in fluorescent ink. If this mass ratio is less than 1.0 time, it is sometimes impossible to sufficiently swell the resin particles and sufficiently relax the association of the fluorescent dye. As a consequence, concentration quenching becomes difficult to sufficiently suppress and the fluorescence intensity improving effect slightly decreases in some cases. The abovementioned mass ratio is preferably 5.0 times or less, and more preferably 3.0 times or less.

"A water-soluble organic solvent" normally means a liquid, but the water-soluble organic solvent includes a solid at 25° C. (room temperature) in this embodiment. Practical examples of the water-soluble organic solvent that is a solid at 25° C. and versatile to aqueous ink are 1,6-hexanediol, trimethylol propane, ethylene urea, urea, and polyethylene glycol having a number-average molecular weight of 1,000.

[Resin: Water-Soluble Resin, Resin Particle]

The clear ink preferably further contains a resin. This resin can be either a water-soluble resin soluble in an aqueous medium, or a water-dispersible resin (water-insoluble resin) that can exist in a state in which it is dispersed in the form of particles in an aqueous medium.

A water-soluble resin can be used as a resin to be contained in the second ink. That is, the clear ink preferably further contains a water-soluble resin. When using the clear ink containing a water-soluble resin, the water-soluble resin enters the resin particles swollen by the water-soluble organic solvent. This makes it possible to suppress concentration quenching caused by the association of the fluorescent dye, and improve the fluorescence intensity of an image. The content (mass %) of the water-soluble resin in the second ink is preferably 0.1 mass % or more to 5.0 mass % or less on the basis of the total mass of the clear ink. The content (mass %) of the water-soluble resin in the clear ink is preferably 0.1 time or more as the mass ratio to the content (mass %) of the resin particles in the fluorescent ink. If this mass ratio is less than 0.1 time, it becomes difficult to make a sufficient amount of resin exist in the layer of the first resin particles and the effect of suppressing concentration quenching slightly decreases in some cases. The abovementioned mass ratio is preferably 3.0 time or less, and more preferably 1.0 time or less.

Resin particles can also be used as the resin to be contained in the clear ink. That is, the clear ink preferably further contains resin particles. When using the clear ink containing the resin particles, the resin particles in the clear ink enter spaces between the resin particles in the fluorescent ink, so the distance between adjacent resin particles can further be increased. This makes it possible to further suppress concentration quenching and further increase the fluorescence intensity of an image. The content (mass %) of the resin particles in the clear ink is preferably 0.1 mass % or more to 5.0 mass % or less on the basis of the ink total mass. Note that the clear ink is ink containing no coloring material, so the resin particles do not contain any coloring material.

The volume-based cumulative 50% particle size of the second resin particles in the clear ink is 0.3 time or more to 2.0 times or less as the ratio to the volume-based 50% particle size of the resin particles in the fluorescent ink. If this ratio is less than 0.3, concentration quenching becomes difficult to suppress because the distance between adjacent resin particles cannot sufficiently be increased, so the fluorescence intensity improving effect sometimes slightly decreases. On the other hand, if the abovementioned ratio exceeds 2.0 times, the resin particles cannot easily enter the spaces between adjacent resin particles in some cases. Therefore, the distance between the resin particles cannot be increased, so concentration quenching becomes difficult to suppress, and the fluorescence intensity improving effect sometimes slightly decreases.

The resin particles are favorably resin particles having a core-shell structure. An image having higher fluorescence intensity can be printed by using the clear ink containing the resin particles having the core-shell structure. In the resin particle having the core-shell structure, the functions of the core portion and the shell portion are normally clearly separated. For example, when compared to a resin particle having a single-layered structure, a resin particle having a core portion including a unit not containing an acidic group, and a shell portion including an acidic group-containing unit, has high dispersion stability even when the acid values are the same, so the particle size distribution of the resin particles narrows. Since this makes it possible to easily control the volume-based cumulative 50% particle size, an image having higher fluorescence intensity can be printed by using the clear ink containing the resin particles. Also, many resin particles having a core portion including a hydrophobic group-containing unit can remain in the layer of the resin particles in the fluorescent ink. Accordingly, an image having higher fluorescence intensity can be printed by using the clear ink containing the resin particles.

The resin forming the water-soluble resin and the resin particles is preferably a resin (anionic resin) having an anionic group, and a resin having no cationic group. Practical examples of the resin are an acrylic resin, an olefinic resin, and a urethane-based resin. Among them, the acrylic resin is particularly favorable. As the acrylic resin, it is possible to use a resin having a unit deriving from (meth) acrylic acid or a unit deriving from (meth)acryl ester. An acrylic resin having a hydrophilic unit and a hydrophobic unit is particularly favorable.

Examples of the monomer that forms a hydrophilic unit by polymerization are acidic monomers having carboxylic acid groups such as (meth)acrylic acid, itaconic acid, maleic acid, and fumaric acid;

monomers having hydroxy groups such as 2-hydroxyethyl (meth)acrylate and 3-hydroxypropyl (math)acrylate; and a monomer having an ethylene oxide group such as methoxy(mono, di, tri, poly)ethylene glycol (meth) acrylate.

Examples of the monomer that forms a hydrophobic unit by polymerization are monomers having aromatic rings such as styrene, α-methylstyrene, and benzyl (meth)acrylate; and monomers having aliphatic groups such as ethyl (meth) acrylate, methyl (meth)acrylate, (iso)propyl (meth) acrylate, (n-, iso-, t-)butyl (meth)acrylate, and 2-ethylhexyl (meth)acrylate.

(Aqueous Medium)

Each ink forming an ink set is aqueous ink containing at least water as an aqueous medium. Ink can also contain a water-soluble organic solvent as an aqueous medium. As the water, it is favorable to use deionized water or ion-exchanged water. The content (mass %) of the water in the ink is preferably 50.0 mass % or more to 95.0 mass % or less based on the total mass of the ink. As the water-soluble organic solvent, it is possible to use any solvent generally used in ink. Examples are alcohols, (poly)alkylene glycols, glycol ethers, nitrogen-containing compounds, and sulfur-containing compounds. The content (mass %) of the water-soluble organic solvent in ink is preferably 3.0 mass % or more to 50.0 mass % or less on the basis of the total mass of the ink. "The content of the water-soluble organic solvent" in the clear ink includes the content of the water-soluble organic solvent.

(Other Additives)

Each ink forming an ink set can contain various additives such as a surfactant, a pH adjuster, a corrosion inhibitor, an antiseptic agent, an antifungal agent, an antioxidant, an antireductant, an evaporation accelerator, a chelating agent, and other resins. Generally, the contents of these additives are very small in ink and hence have very small "direct" influence on swelling of the resin particles. Note that the fluorescent ink can contain coloring materials such as a pigment and a dye (nonfluorescent dye). Normally, however, the fluorescent ink need not contain the coloring materials described above. The clear ink does not contain any coloring material (including a fluorescent dye).

(Physical Properties of Ink)

Each ink forming an ink set is aqueous ink applicable to an inkjet system, so it is desirable to properly control its physical property values. More specifically, the surface tension of the ink at 25° C. measured by the plate method is preferably 20 mN/m or more to 60 mN/m or less, and more preferably 25 mN/m or more to 45 mN/m or less. The viscosity of the ink at 25° C. is preferably 1.0 mPa·s or more to 10.0 mPa·s or less, and more preferably 1.0 mPa·s or more to 5.0 mPa·s or less. The pH of the ink at 25° C. is preferably 7.0 or more to 10.0 or less.

In this embodiment, ink containing resin particles dyed by the fluorescent dye is used as the fluorescent ink. However, the fluorescent ink is not limited to this.

It is also possible to use fluorescent ink formed by mixing a dispersion of a fluorescent colorant, a solvent, and an activator. In this case, the dispersion of the fluorescent colorant is a dispersion of a colorant having the above-described fluorescence characteristic. Examples are NKW-3207E (a fluorescent pink water dispersion: Nihon Keiko Kagaku corporation) and NKW-3205E (a fluorescent yellow water dispersion: Nihon Keiko Kagaku corporation). However, the dispersion of the fluorescent colorant can be any dispersion of a colorant having the fluorescence characteristic.

Ink is formed by dispersing the abovementioned fluorescent colorant dispersion by combining a known solvent and a known activator with the dispersion. The method of dispersing the fluorescent colorant dispersion is not particularly limited. For example, it is possible to use a fluorescent colorant dispersion dispersed by a surfactant, and a resin-dispersed fluorescent colorant dispersion dispersed by a dispersion resin. It is, of course, also possible to use fluorescent colorant dispersions dispersed by different methods by combining them. As the surfactant, it is possible to use an anionic surfactant, a nonionic surfactant, a cationic surfactant, and a zwitterionic surfactant. The dispersion resin can be any water-soluble or water-dispersible resin. In particular, the weight-average molecular weight of the dispersion resin is preferably 1,000 or more to 100,000 or less, and more preferably 3,000 or more to 50,000 or less. As the solvent, it is favorable to use an aqueous medium containing water and a water-soluble organic solvent.

This embodiment uses six inks, that is, fluorescent pink (FP), clear ink, and color inks of K, C, M, and Y manufactured by the known method.

<Print Medium>

A print medium of this embodiment includes a base and at least one ink absorbing layer. In this embodiment, the print medium is preferably an inkjet print medium to be used in an inkjet image printing method. In addition, the print medium is preferably a glossy print medium. In this embodiment, a glossy print medium is used as the print medium, and color pigment ink is used as a colorant (or a coloring material). In addition, ink containing resin particles dyed by a fluorescent dye is used as fluorescent ink. Accordingly, an image formation process is performed by a model in which a colorant is deposited. Furthermore, the print medium is preferably a print medium in which the absorbing layer has pores, and the pore size is smaller than the size of the resin particles of the fluorescent ink and larger than the particle size of a resin in clear ink. This embodiment will be explained by using the ink deposition model.

<Concentration Quenching and Improvement of Fluorescence Intensity>

Next, a decrease of the fluorescence intensity of a fluorescent colorant and a mechanism of improving the fluorescence intensity of an image by using the fluorescent ink containing a fluorescent dye and the clear link will be explained.

Concentration quenching is one cause of decreasing the fluorescence intensity of an image. Concentration quenching is a phenomenon in which when the concentration of a fluorescent colorant increases to a certain degree or more, the fluorescence intensity of an image to be printed decreases instead of increasing. Concentration quenching generally occurs when excitation energy absorbed by the fluorescent colorant is moved and consumed between fluorescent colorant molecules by the intermolecular interaction of the fluorescent colorant. Therefore, as the intermolecular distance of the fluorescent colorant increases, concentration quenching occurs less easily. However, when fluorescent ink containing a fluorescent dye is given to the print medium, the fluorescent dye associates and flocculates in the print medium as liquid components penetrate the print medium. Since the intermolecular distance of the fluorescent dye decreases when the fluorescent dye flocculates, concentration quenching easily occurs, and this probably decreases the fluorescence intensity of an image.

To increase the fluorescence intensity of an image, it is important to increase the intermolecular distance of the fluorescent dye by relaxing the association and flocculation of the fluorescence dye. It is known that the fluorescence intensity can be increased by applying ink containing the fluorescent dye and clear ink to a print medium regardless of the order of application. This will be explained below by taking a case in which clear ink is applied after fluorescent ink is applied to a print medium as an example. When the clear ink is applied on the fluorescent ink and the clear ink comes in contact with the associated or flocculated fluorescent dye, a water-soluble organic solvent having high affinity to the fluorescent dye also comes in contact with the associated body or the flocculated body of the fluorescent dye. The water-soluble organic solvent solvates a portion of the fluorescent dye and loosens the associated body or the flocculated body. Consequently, the fluorescent dye easily diffuses in the print medium, and the fixing range of the fluorescent dye extends. This presumably increases the intermolecular distance of the fluorescent dye and raises the fluorescence intensity of an image.

<Color Development Difference Caused by Application Order of Fluorescent Ink and Clear Ink>

An order of applying fluorescent ink containing resin particles dyed by a fluorescent dye and clear ink to a print medium and differences in emission intensity, color development, and particularly chroma will be explained below.

Figure 9:
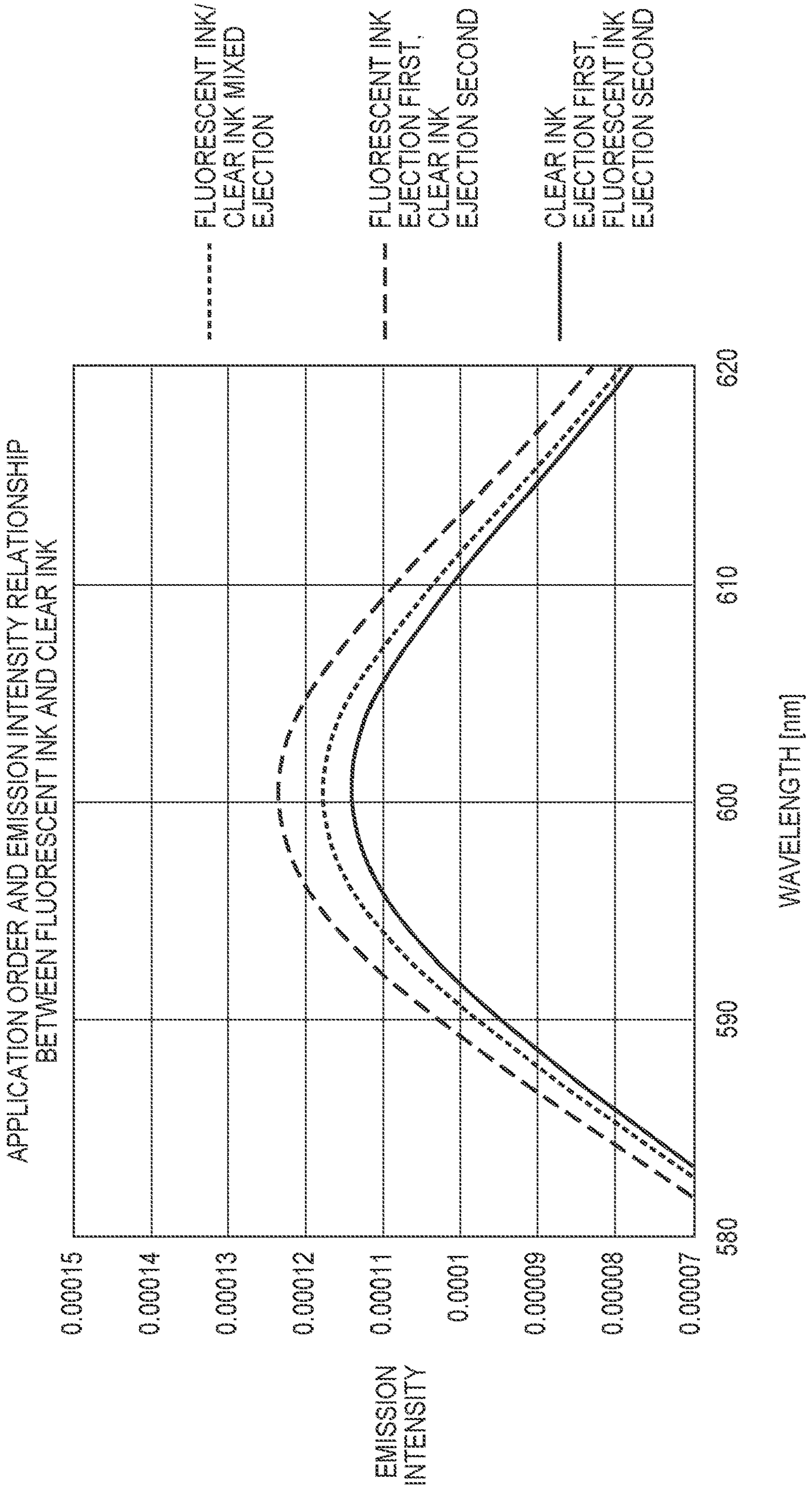
FIG. 9 is a view showing emission intensities obtained when printing fluorescent pink ink and clear ink on a print medium by changing the order of application of these inks.

FIG. 9 shows the measurement results of the emission intensity when almost equal amounts of fluorescent pink ink and clear ink were printed on glossy paper as a print medium by changing the application order. This embodiment will be explained by taking FIG. 9 as an example. FIG. 9 is a graph in which the ordinate indicates the emission intensity (the brightness measured by a spectral radiance meter), and the abscissa indicates the wavelength of light. The wavelength on the abscissa indicates about 600 nm as the emission wavelength of the fluorescent pink ink.

FIG. 9 shows the results of measurement performed by using the following three combinations as the application order of the fluorescent ink and the clear ink.

(a) The fluorescent ink is applied first, and then the clear ink is applied (a state in which the fluorescent ink forms a lower layer on a print medium) (this will be expressed as fluorescent ink ejection first/clear ink ejection second hereinafter).

(b) The fluorescent ink and the clear ink are simultaneously applied (a state in which the fluorescent ink and the clear ink are mixed on a print medium) (this will be expressed as fluorescent ink/clear ink mixed ejection hereinafter).

(c) The clear ink is applied first and then the fluorescent ink is applied (a state in which the fluorescent ink forms an upper layer on a print medium) (this will be expressed as clear ink ejection first/fluorescent ink ejection second hereinafter).

As shown in FIG. 9, the emission intensity has clear differences.

More specifically, the order of the emission intensities is:

$$(a)>(b)>(c)$$

The emission intensity improves in the state in which the fluorescent layer forms a lower layer on a print medium.

Accordingly, in a region where the emission intensity is to be increased, the application order of the fluorescent ink and the clear ink is preferably so controlled as to apply the fluorescent ink first and apply the clear ink after that, so that the fluorescent ink forms a lower layer on a print medium.

In addition, the present inventors made extensive studies about a time difference during which the fluorescent ink and the clear ink come in contact with each other on a print medium. A difference was found in the above-described light emission effect (the difference in emission intensity caused by the printing order) between a case in which the clear ink was applied at an interval of a few tens of seconds after an image was formed on a print medium by using the fluorescent ink, and a case in which the fluorescent ink and the clear ink were applied by simultaneous scan (the time difference was less than 0.1 sec). In the latter case, the time difference was a difference produced at a normal scanning velocity of a printing apparatus. Note that "application by simultaneous scan" is implemented by forming an image by performing scan once by ejecting the fluorescent ink by a printhead on the front side in the scanning direction and ejecting the clear ink by a printhead on the rear side.

Furthermore, when the application time difference between the fluorescent ink and the clear ink was confirmed, the above-described light emission effect difference was found even when the fluorescent ink was applied by the first scan and the clear ink was applied by the next scan. In this case, the application time difference between the fluorescent ink and the clear ink was 1.0 sec when calculated from the scanning velocity.

When the application time difference between the fluorescent ink and the clear ink was confirmed by the simultaneous scan alone, a sufficient effect was obtained when the time difference was similarly 1.0 sec or more.

Accordingly, the application time difference from printing by the fluorescent ink to printing by the clear ink is preferably a predetermined time or more, for example, 1.0 sec or more. However, even when the time difference does not exceed 1.0 sec, the emission intensity can be improved by printing the fluorescent ink first and then printing the clear ink on the fluorescent ink.

The reason why the emission intensity difference is produced by the application order of the fluorescent ink and the clear ink will be explained below. As described above, when the fluorescent ink and the clear ink are applied on a print medium, the intermolecular distance of the fluorescent dye increases, and this presumably relaxes concentration quenching and improves light emission.

When the clear ink is applied first, the water-soluble organic solvent and a portion of the resin in the clear ink penetrate inside a print medium. The remaining water-soluble organic solvent and resin reduced by penetration exist on the print medium. When the fluorescent ink is applied later, the probability at which the fluorescent dye in the fluorescent ink comes in contact with the water-soluble organic solvent and the resin remaining on the print medium reduces. The emission intensity probably decreases by the reduction amount of the opportunity of contact. On the other hand, when the clear ink is applied after the fluorescent ink is applied, the reduction of the probability at which the water-soluble organic resin and the resin in the clear ink come in contact with the fluorescent dye in the fluorescent ink reduces. When the fluorescent ink and the clear ink are simultaneously applied, the contact probability perhaps exists between those in the above two cases. This demonstrates that the application order of the fluorescent ink and the clear ink produces the emission intensity difference.

Figure 10:
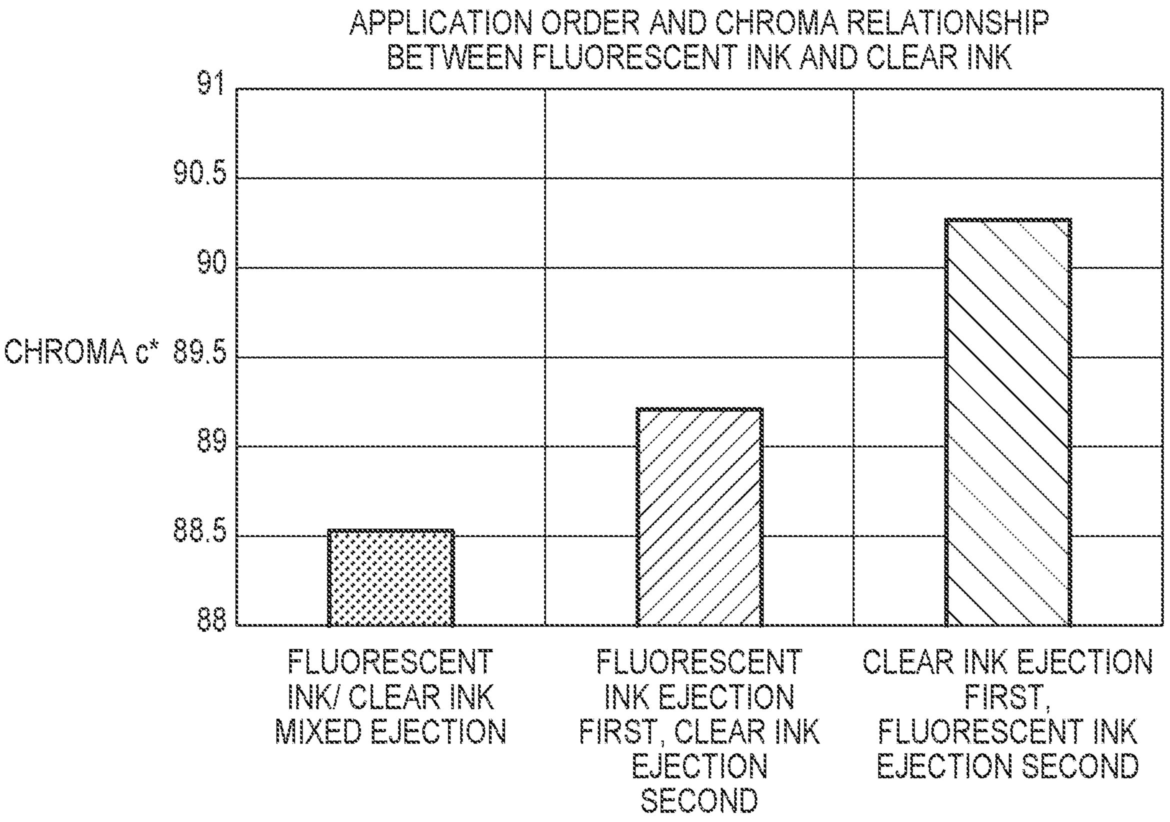
FIG. 10 is a view showing chromas obtained when printing fluorescent pink ink and clear ink on a print medium by changing the order of application of these inks.

FIG. 10 shows the measurement results of the chroma when almost equal amounts of the fluorescent pink ink and the clear ink were printed on glossy paper by changing the application order. Chroma C* indicates the chroma of CIE L*a*b*, and C*=√(a*^2+b*^2) (^2 indicates square). FIG. 10 is a graph in which the ordinate indicates the chroma, and the abscissa indicates the application order of the fluorescent ink and the clear ink.

The application order of the fluorescent ink and the clear ink is the same as described above, and a clear difference is found in chroma as can be seen from FIG. 10. More specifically, the chroma is (c)>(a)≠(b).

That is, the chroma improves in a state in which the fluorescent ink forms an upper layer on a print medium. Accordingly, in a region where an image having high chroma is to be printed, the application order of the fluorescent ink and the clear ink is preferably so controlled as to apply the clear ink first and apply the fluorescent ink after that, so that the fluorescent ink forms an upper layer on a print medium. In addition, a sufficient effect can be obtained by simultaneously applying the fluorescent ink and the clear ink such that the fluorescent ink and the clear ink are mixed on a print medium.

The reason why the chroma difference is produced by the application order of the fluorescent ink and the clear ink will be explained next. When the clear ink is applied first, the water-soluble organic solvent and a part of the resin in the clear ink penetrate inside a print medium. At the same time, some pores of an absorbing layer on the print medium are closed. This state is also called "filling". When the fluorescent ink is applied after that, water other than the fluorescent colorant in the fluorescent ink penetrates more slowly than when the ink is directly applied on a print medium. Therefore, flocculation of the fluorescent colorant takes time on the print medium, so a more uniform film can be formed. The state in which the colorant is uniformly distributed is advantageous for color development. Since the colorant layer is uniformly formed, therefore, color development of the fluorescent ink layer improves, and this probably improves the chroma. On the other hand, when the clear ink is applied after the fluorescent ink is applied, the water-soluble organic solvent and the resin in the clear ink redissolves the fluorescent colorant layer, so the uniformity of the film decreases. However, the uniformity of the colorant layer improves at the same time because the clear ink forms an upper layer. The final colorant layer is uniform, but this uniformity is lower than that when the fluorescent ink is applied later. Therefore, the improvement of color development is low, and this perhaps decreases the improvement of the chroma as well. When the fluorescent ink and the clear ink are applied at the same time, the state is presumably intermediate between them. This probably produces the difference in improvement of the chroma due to the application order of the fluorescent ink and the clear ink.

As described above, the present inventors made extensive studies and have found that the application order of the fluorescent ink and the clear ink produces differences in emission intensity and chroma, and the conditions under which both the emission intensity and the chroma improve have a conflicting relationship. Based on the above results, this embodiment performs control that changes the application order of the fluorescent ink and the clear ink in accordance with a region of an image to be printed, thereby obtaining an image improving effect required by the region. A processing procedure according to the first embodiment will be explained below with reference to FIG. 11.

<Processing Procedure>

Figure 11:
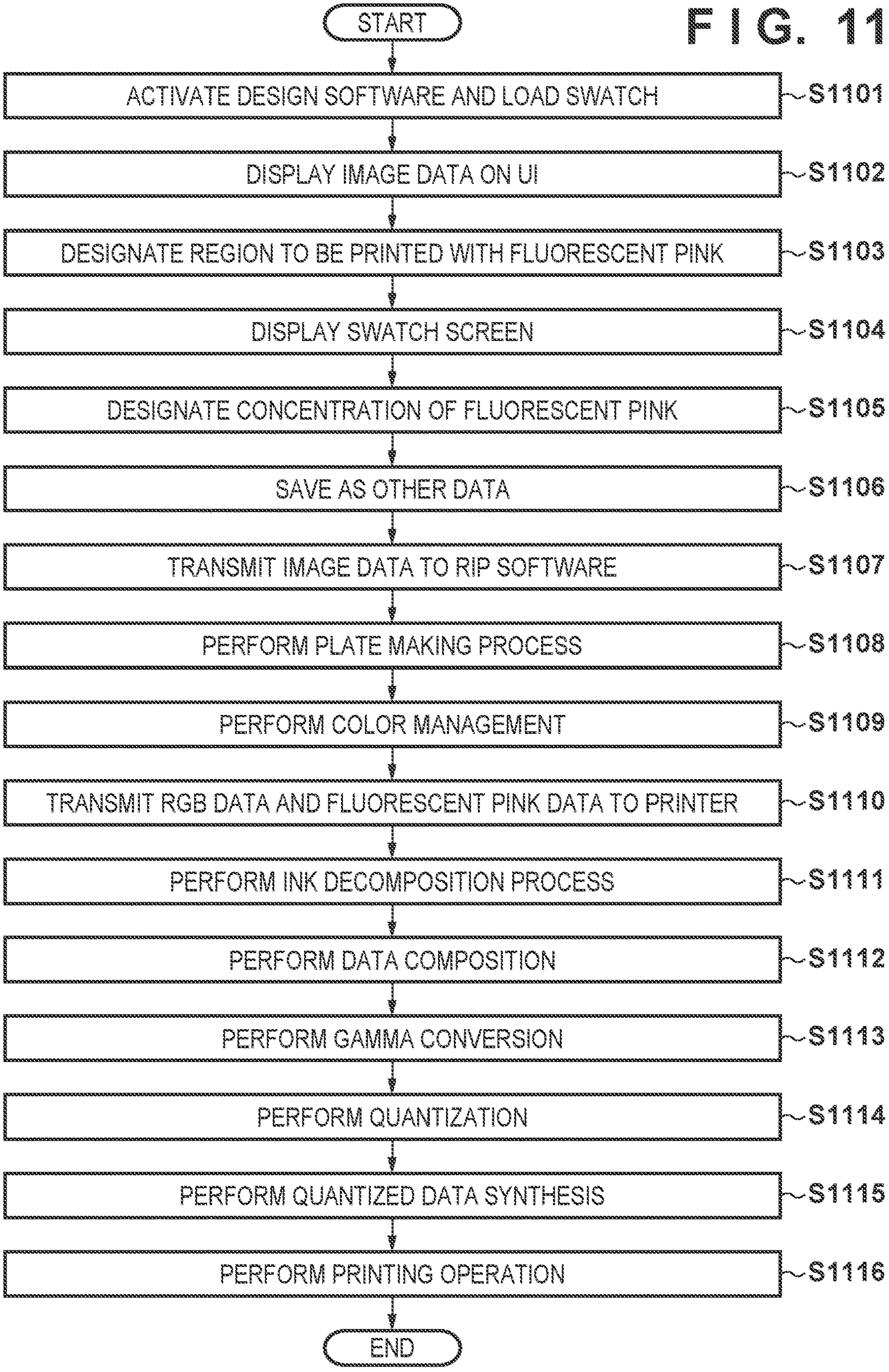
FIG. 11 is a view showing the procedure of an image editing/printing process using the design software.

FIG. 11 shows the procedure of an image editing/printing process using design software of the printing system of this embodiment. In this image editing/printing process shown in FIG. 11, the PC 101 as an image processing apparatus transmits image data formed by the design software 102 to the RIP software 103. The RIP software 103 converts the image data into data having undergone color management, and transmits the data to the printing apparatus 104. The printing apparatus 104 performs a process of generating ink ejection data and performing printing. That is, an information processing apparatus such as the PC 101 executes steps S1101 to S1110 in FIG. 11, and some steps are executed in accordance with user's operations. Also, the printing apparatus 104 executes steps from step S1111.

First, in accordance with a user's operation or the like, the PC 101 activates the design software 102 shown in FIG. 1 and loads a swatch in which fluorescent pink ink is preset (step S1101).

Figure 12A:
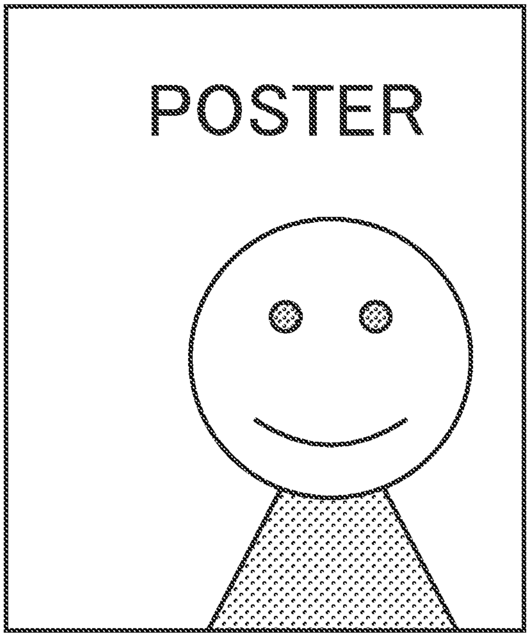
FIGS. 12A and 12B are views schematically showing the image data.
Figure 12B:
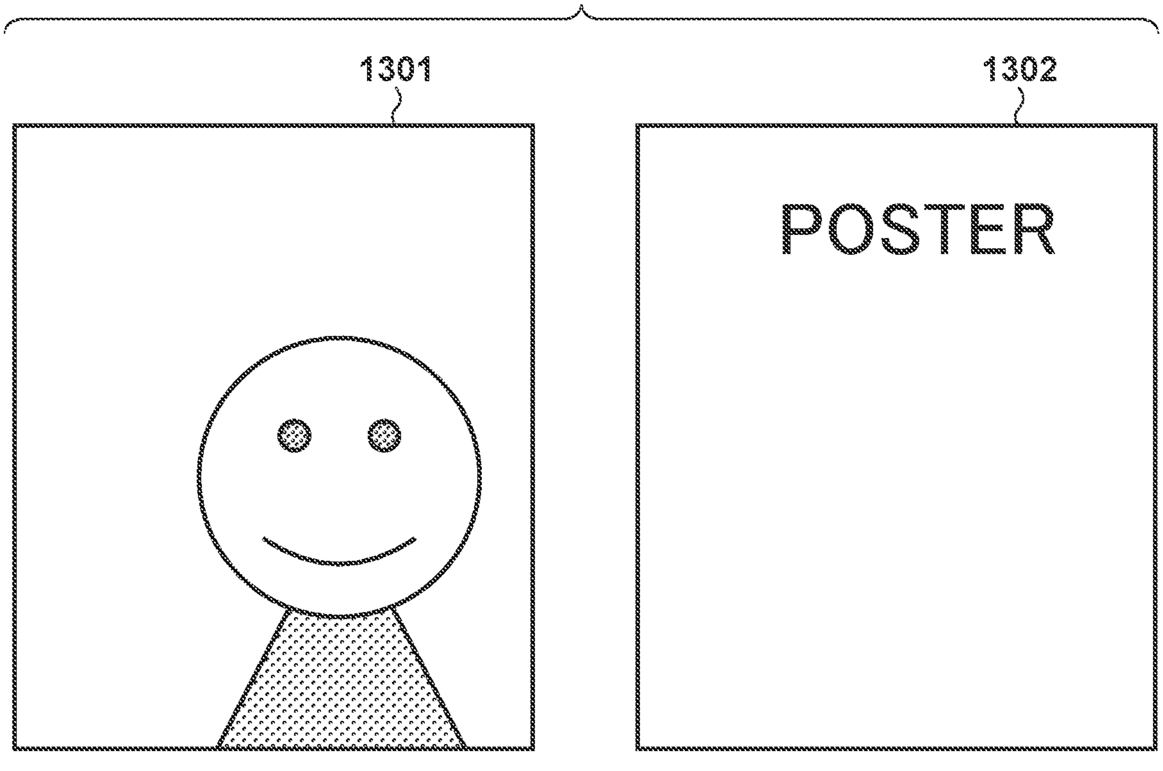

Then, when the user selects image data to be printed, the PC 101 displays the selected image data on the UI (step S1102). By the design software 102, the screen 201 shown in FIG. 2 indicates an example of the whole screen to be displayed when image data shown in FIGS. 12A and 12B is opened. An image can be one selected by the user. In this stage, the swatch (color sample) 209 is not displayed unlike in FIG. 2. As shown in FIG. 12A, this embodiment uses a color image having 8 bits for each of R, G, and B as the image data.

Subsequently, the user designates a special color area to be printed by fluorescent pink (step S1103). In this special color area, the concentration of fluorescent pink can be selected by using the swatch, and can also be directly designated. For example, the user selects six characters of the text "POSTER" on the image 202 by using a pointing device or the like. In this case, the window 204 displays the signal values of the text. The signal values of (R, G, B, P (=fluorescent pink)) of the selected text are (190, 64, 64, 0).

Then, when the user presses the color change button 208, the information processing apparatus 101 displays the swatch screen 209 shown in FIG. 2 (step S1104). The screen can be transitioned from FIG. 2, and can also be another screen.

Subsequently, when the user designates a patch of the concentration of fluorescent pink to be designated from the swatch by using a pointing device or the like, the information processing apparatus 101 displays pixel value information corresponding to the patch (step S1105). FIG. 2 shows that the patch indicated by the pointer 203 has (255, 255, 0, 153) as the signal values of (R, G, B, P). In this step, the six characters of the text "POSTER" in the image 202 are set as fluorescent pink data. It is also possible to manually set a value designated by the user in the pixel value window 210. If pixel values manually set by the user are often used, these pixel values can also be preset in the swatch.

Then, the design software 102 saves the formed image data as data different from the selected image data (step S1106). In the example shown in FIG. 2, the formed image data has RGB image data and fluorescent pink data, that is, data of four colors. When forming fluorescent pink as data other than RGB colors by the design software, a color image is normally formed as an image by synthesizing layers 1301 and 1302 as shown in FIG. 12B. The layer 1301 is formed as a color image (normal color area) in which each of R, G, and B is represented by 8 bits, and the layer 1302 is formed as a gray image (special color area) in which fluorescent pink data is represented by 8 bits. The formed image data is configured by superposing these layers. Note that the special color area is not limited to fluorescent pink and may also be, for example, a region drawn by a color indicating the ink color itself. Note also that one image data can contain special color areas of a plurality of different colors.

Then, in the information processing apparatus 101, the design software 102 transmits the formed image data to the RIP software 103 (step S1107). As shown in FIG. 12B, the image data to be transmitted has data of the four colors (R, G, B, and fluorescent pink). The design software 102 can also form two or more pages of image data and transmit the two or more pages of image data to the RIP software 103. In this example, the region having the text "POSTER" on the image 202 is superposed on the region showing "human face". In this case, image data showing "human face" and image data having the text "POSTER" are transmitted to the RIP software 103. The RIP software performs plate making on the plurality of pages of transmitted image data, and transfers one image data to the printing apparatus.

Subsequently, the RIP software 103 performs a plate making process (step S1108). In this embodiment, the process is performed by "knockout" of the three processing means shown in FIG. 3B in order to highlight the text portion designated as the special color area. In addition, the RGB image data shown in Case 1 is input as the frontage, and the fluorescent pink data as the background. Consequently, image data having undergone the plate making process contains no fluorescent pink data, so an image in which the special color area is highlighted more can be formed by synthesizing fluorescent pink by a data synthetizing process in the subsequent stage.

Then, the CMS 604 in the RIP software 103 performs color management on the RGB data 601 (step S1109). In this step, the standard RGB data formed by the design software 102 is converted into device RGB data to be expressed by the printing apparatus and a print medium as a printing target. This decreases divergence between the appearance on the display of the PC 101 and the appearance of a printed product. Since the size of a color gamut expressible by the display is larger than the printed product, this embodiment performs the conversion such that a range exceeding the expression gamut of the printed product is pasted on the gamut limit of the printed product. It is assumed that the RGB image data 601 is input to the CMS 604. The fluorescent pink data 602 is not a conversion target.

Subsequently, the information processing apparatus 101 transmits the RGB image data having undergone the gamut conversion and the fluorescent pink data to the printing apparatus 104 (step S1110). The image processing apparatus main control unit 411 shown in FIG. 4 performs each processing in the printing apparatus 104 from step S1111.

The ink decomposition processing unit 605 performs an ink decomposition process on the RGB data 601 on which the color management is executed (step S1111). The ink decomposition process is a process of performing conversion to ink colors of the printhead 405 based on the RGB color distribution. More specifically, the data is decomposed into 16-bit gradation data (concentration data) as each of cyan data, magenta data, yellow data, black data, and fluorescent pin data. Fluorescent pink is an image independent of the RGB image, so this color need not be a decomposition target as explained with reference to FIGS. 6A and 6B if the data is originally 16-bit image data. However, if the original data is 8-bit data, the data can be input to the ink decomposition processing unit 605 and converted into 16-bit data. In this stage, five channels (five colors) of 16-bit gray images are generated.

On the other hand, in step S1111, an application region of the clear ink is decided and image data of the clear ink is generated. In this case, the fluorescent pink image data can be input to the ink decomposition processing unit 605 via the CMS 604, and can also be directly input to the ink decomposition processing unit 605 from the design software 102. In this embodiment, it is decided that the clear ink is given to a normal color area as the image data region 1301 showing "human face" as shown in FIG. 12B, and to a special color area as the image data region 1302 showing the text "POSTER". Then, different clear ink data are generated for the normal color area and the special color area. More specifically, clear (normal color area) data and clear (special color area) data are generated as 16-bit gray image data. The clear data can be generated for only a portion to be printed by another ink as a target. For example, the clear data can be generated for a region in which the sum of color component values is not 0 (that is, for a region which is not paper white), in each of the original RGB image data and fluorescent pink image data. The concentration value (or the brightness value) of the clear data can be predetermined. Alternatively, the concentration can also be set in accordance with the concentration of an ink color other than clear. In this case, the clear ink is printed at high density if the printing concentration of the CMYK inks and the florescent pink ink is high, and is printed at low density if the printing concentration of the CMYK inks and the florescent pink ink is low. For a color (for example, fluorescent pink) on which the clear ink is to be printed, the clear ink can be printed at a concentration corresponding to the printing concentration of that ink. Also, for a color below which the clear ink is printed, the clear ink can be printed at a predetermined concentration.

The fluorescent pink data 602 input from the design software 102 to the RIP software 103 is already a gray image equivalent to the ink concentration, and hence is not a processing target of the ink decomposition processing unit 605. However, the fluorescent pink data 602 is also converted into a 16-bit gray image so as to match the number of bits of other ink colors. The ink decomposition processing unit 605 is generally a conversion means using a lookup table, but is not limited to this. For example, conversion can also be performed by using an equation.

Subsequently, synthetic image data is generated by synthesizing the CMYK image of the normal color area and the fluorescent pink data of the special color area generated in step S1111 (step S1112). That is, the data synthesis processing unit 606 synthesizes the CMYK data converted by the ink decomposition processing unit 605 in step S1111 and the fluorescent pin data input from the RIP software 103, and outputs the synthesis result. If the output data from the ink decomposition processing unit 605 contains a fluorescent pink component, the synthesizing process is performed by including it. If the fluorescent pink data is converted into 16-bit data by the ink decomposition processing unit 605, the fluorescent pink data can be synthesized with the CMYK data input from the ink decomposition processing unit 605. The purpose of this processing is to synthesize the CMYK ink data and the fluorescent pink ink data into one data corresponding to the head of the printing apparatus. The data synthesis processing unit 606 can be executed after the gamma conversion processing unit 607 or the quantization processing unit 608. The synthesizing method can be any of knockout, overprint, and multiplication explained with reference to FIG. 3B, and can also be another means.

Then, the gamma conversion processing unit 607 performs gradation conversion on the signal value of each ink data of the printing apparatus by using a gamma curve, so that a change of the signal value output from the ink decomposition processing unit 605 and a concentration change on the print medium linearly correspond to each other (step S1113). The gamma conversion gives a gamma curve to a signal value such that a visible color change linearly changes. This embodiment is favorable in that the processing is performed on the fluorescent pink data synthesized by the data synthesis processing unit 606, as image data of fluorescent pink ink. When the gamma conversion processing unit 607 is performed before the data synthesis processing unit 606, the gamma conversion process is necessary for the fluorescent pink data 602 input from the design software 102 to the RIP software 103. The gamma conversion processing unit 607 is generally a conversion means using a lookup table, but is not limited to this. For example, the conversion can also be performed by using an equation.

Subsequently, the quantization processing unit 608 converts each ink data processed by the gamma conversion processing unit 607 into dot data (step S1114). A predetermined quantization process is performed on gradation data corresponding to each ink color, thereby converting the data into quantized data having a few bits. For example, when performing quantization to three values, the gradation data is converted into 2-bit data having levels from level 0 to level 2. An index developing process is performed as needed. More specifically, from a plurality of dot arrangement patterns defining the number and positions of dots to be printed in each pixel, one dot arrangement pattern is selected as it is associated with the above-described converted level. This dot arrangement table can have a form in which the number of dots to be printed in a region equivalent to each pixel is changed in accordance with the level value, and can also have a form in which the size of a dot is changed in accordance with the level value.

An existing method is applicable to the quantization method. The dot data of the individual ink colors are cyan data, magenta data, yellow data, black data, fluorescent pink data, clear (normal color area) data, and clear (special color area) data.

Then, the clear ink data of the quantized data generated in step S1114 are synthesized. The dot data of the quantized clear (normal color area) data and clear (special color area) data are synthesized, and the synthesis result is output (step S1115). In this step, information (to be referred to as attribute information hereinafter) capable of determining whether each of the two clear ink dot data is a printing pixel of the special color area or the normal color area is given. However, this attribute information can also be given to all colors in order to obtain a constant data format. For example, 0 is held as the attribute information for pixel data of the special color area, and 1 is held as the attribute information for a pixel of the normal color area.

Finally, printing scan and a conveyance operation are repeated based on the dot data for controlling ON/OFF of ejection converted in step S1115, and on the path mask, thereby ejecting each ink from the printhead 405 and printing an image (step S1116).

Image Printing Method

A process of printing an image by ejecting ink from the printhead will be explained below. A case in which 2-pass bidirectional printing (ejection in the forward and backward directions shown in FIG. 5B) is performed by using the printhead 405 shown in FIGS. 5A and 5B will be explained below. Ejection data generated in steps 1101 to 1115 described above are set as follows with respect to the nozzle arrays of the individual colors.

Nozzle array 501C, cyan data

Nozzle array 501M, magenta data

Nozzle array 501Y, yellow data

Nozzle array 501K, black data

Nozzle array 501FP, fluorescent pink data

Nozzle array 501CL, clear (normal color area) data

Figure 13:
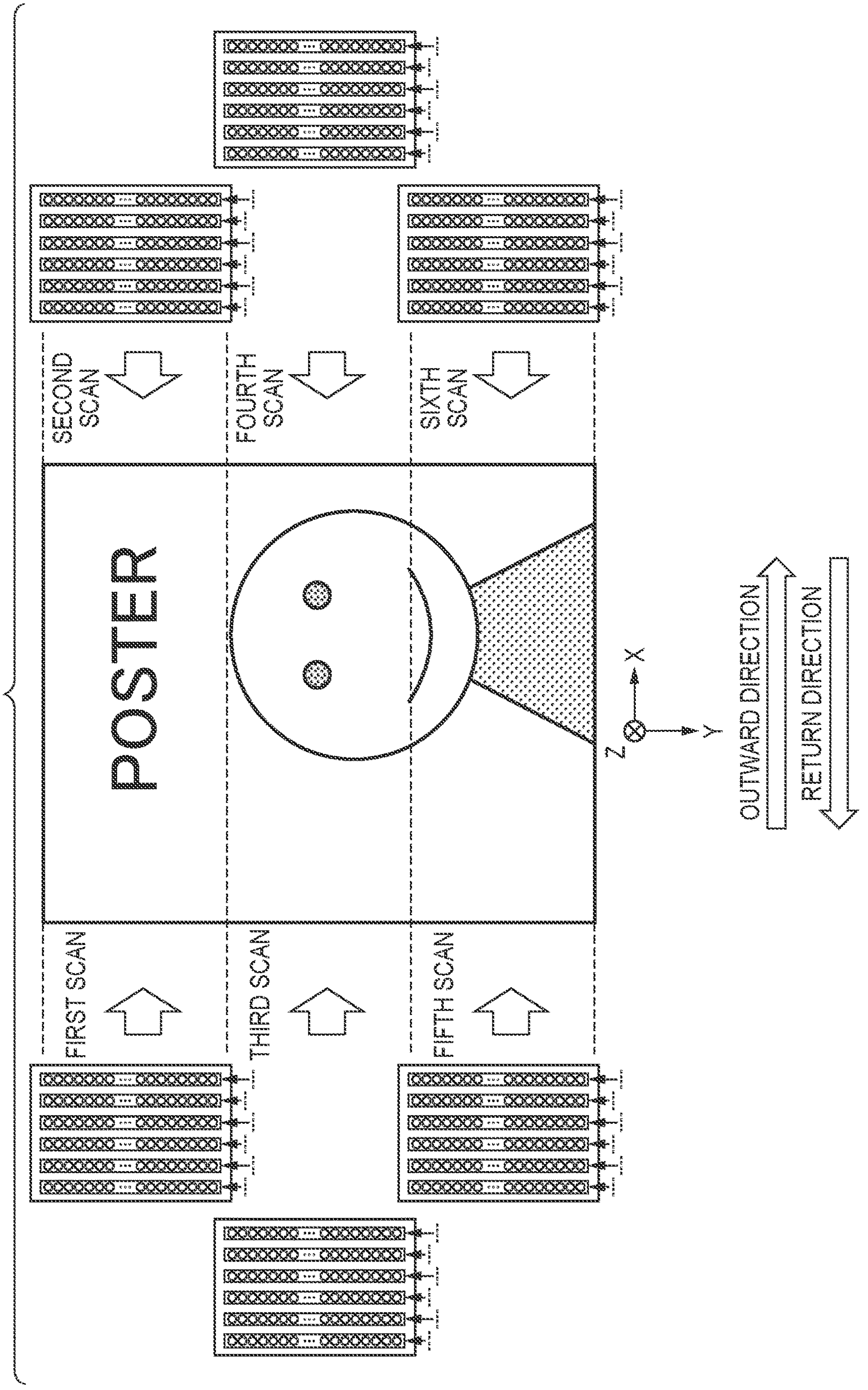
FIG. 13 is a view schematically showing the relative positional relationship between a printhead and a printed image.

FIG. 13 is a view schematically showing the relative positional relationship between the printhead shown in FIGS. 5A and 5B and the printed image shown in FIG. 12A. Image printing is completed by repeating scans from the first scan to the sixth scan. After one scan in each of the forward scan and the backward scan is performed, that is, after a total of two scans are performed, the printhead is moved relative to the print medium by the nozzle length in the Y direction shown in FIG. 13. This can be implemented by conveying the print medium relative to the printhead by the nozzle length in a direction opposite to the Y direction. That is, if the specific region is focused, printing of a specific region is completed by two scans (paths). In this case, fluorescent pink ink and clear ink are printed by different scans. As a consequence, the time difference between scans for printing fluorescent pink ink and clear ink becomes 1.0 sec or more. Note that in order to secure this time difference, image formation can also be performed by scanning the same region twice in only the forward scan. When printing is performed by round trip, the scan interval shortens at the end portion on the turn-around side, and prolongs at the end portion on the opposite side. By contrast, when the same region is scanned twice in only the forward scan, the image formation time prolongs, but the scan interval can be uniformized in any region to be scanned, and a sufficient scan interval can also be secured.

Figure 14A:
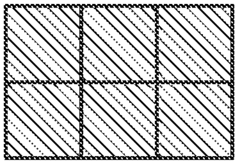
FIGS. 14A to 14D are views schematically showing path masks for controlling ON/OFF of ejection of dot data of a nozzle array in each scan.
Figure 14B:
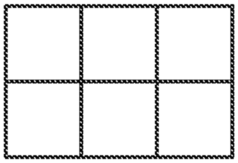

FIGS. 14A to 14D are views schematically showing path masks for controlling ON/OFF of ejection of dot data of the nozzle arrays in each scan when performing reciprocal 2-pass scan. FIG. 14A shows a mask that allows ejection of all pixels (that is, all nozzles), and FIG. 14B shows a mask that does not allow ejection of all pixels. A nozzle allowed to eject ink ejects an ink droplet in accordance with a pixel value. If a pixel value is not indicated by ink ejection, ink is, of course, not ejected even when ejection is allowed. A pixel (nozzle) allowed to eject ink is indicated by black, and a pixel not allowed to eject ink is indicted by white.

Figure 14C:
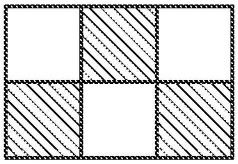
Figure 14D:
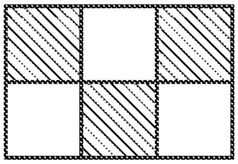

FIGS. 14C and 14D show masks that allow ejection of half of pixels. FIGS. 14A and 14B and FIGS. 14C and 14D have an exclusive relationship. Therefore, all pixels can be printed by selecting one of these masks in first-time scan (first scan), and selecting a mask having the exclusive relationship with the first mask in second-time scan (second scan). In this embodiment, the masks shown in FIGS. 14C and 14D are used for four colors, that is, cyan, magenta, yellow, and black, and the masks shown in FIGS. 14A and 14B are used for fluorescent pink ink and clear ink. A path mask to be allocated to each scan is decided by referring to the above-described attribute information of clear ink.

Printing Order of Fluorescent Pink Ink and Clear Ink

The application (printing) order of fluorescent pink ink and clear ink will be explained in detail below. Since the printing order is controlled by the way of selecting the masks shown in FIGS. 14A to 14D, the mask order of fluorescent ink and clear ink in each scan will be explained. To simplify the explanation, only the ejection portions of fluorescent pink ink and two clear inks will be explained by taking a case where the image shown in FIG. 12A is printed as an example.

When performing forward scan in a region where the attribute information is 0, that is, in a special color area, the mask shown in FIG. 14B is selected for the nozzles of inks other than clear ink, and the mask shown in FIG. 14A is selected for the nozzle of clear ink. When performing backward scan in a region where the attribute information is 0, that is, in a special color area, the mask shown in FIG. 14A is selected for the nozzles of inks other than clear ink, and the mask shown in FIG. 14B is selected for the nozzle of clear ink.

More specifically, in the image shown in FIG. 12A, the first scan is equivalent to the forward scan, and the attribute information is 0 because all target pixels belong to the special color area. When performing the first scan in a region where the attribute information is 0, that is, in a special color area, the mask shown in FIG. 14B is selected for the nozzle of fluorescent pink ink, and the mask shown in FIG. 14A is selected for the nozzle array of clear ink. In the first scan, therefore, fluorescent pink ink is not printed, but clear ink is printed. Note that nothing is printed in a portion containing no image, so this portion can be either masked or unmasked.

Subsequently, the second scan is equivalent to the backward scan, and the attribute information is 0 because target pixels belong to the special color area as in the first scan. Accordingly, the mask shown in FIG. 14A is selected for the nozzle of fluorescent pink ink, and the mask shown in FIG. 14B is selected for the nozzle array of clear ink. In the second scan, therefore, fluorescent pink ink is printed, and clear ink is not printed. As described above, in the special color area, the application order of fluorescent pink ink and clear ink is that clear ink is applied first and fluorescent pink ink is applied next, so clear ink forms a lower layer on the print medium.

In this state, the printhead is moved relative to the print medium by the nozzle length in the Y direction shown in FIG. 13. In the third scan equivalent to the forward scan, the attribute information is 1 because a print target belongs to the normal color area. Accordingly, the mask shown in FIG. 14A is selected for the nozzles of inks other than clear ink. On the other hand, the mask shown in FIG. 14B is selected for the nozzle array of clear ink. In the third scan, therefore, inks other than clear ink are printed, but clear ink is not printed.

Subsequently, in the fourth scan, the target region is the same as that of the third scan and belongs to the normal color area, so the attribute information is 1. Accordingly, the mask shown in FIG. 14B is selected for the nozzles of inks other than clear ink, and the mask shown in FIG. 14A is selected for the nozzle array of clear ink. In the fourth scan, therefore, inks other than clear ink are not printed, but clear ink is printed.

In this state, the printhead is moved relative to the print medium by the nozzle length in the Y direction shown in FIG. 13. Then, the fifth scan and the sixth scan are performed in the same manners as the third scan and the fourth scan, respectively, and printing of the image data is completed.

An image is formed by using clear ink and inks other than clear ink in the order as described above. In the normal color area, therefore, the application order of clear ink and inks other than clear ink is that inks other than clear ink are applied first and clear ink is applied next, so clear ink forms an upper layer on the print medium. As a consequence, the chroma of the special color area in which "POSTER" is written by text characters can be improved because clear ink forms a lower layer on the print medium. Also, the emission intensity of the normal color area including "human face" can be improved because clear ink forms an upper layer on the print medium. Accordingly, the chroma improves in the special color area, and the emission intensity improves in the normal color area, that is, the effects to be obtained in the respective regions can be obtained. Especially when the normal color area includes a region to be printed by fluorescent ink such as fluorescent pink, the emission intensity of that region can be increased. Note that in the above embodiment, clear ink is underlaid so as to form a lower layer of other inks. However, a clear ink printing region can also be limited to a region to be printed by fluorescent color ink such as fluorescent pink in the normal color area.

In this embodiment as described above, the application order of fluorescent ink and clear ink is so set as to obtain the effect of improving the chroma in the special color area, and the effect of improving the emission intensity in the normal color area. However, the application order is not limited to this. It is not a problem to set the application order so as to improve the emission intensity in the special color area and improve the chroma in the normal color area. There is no problem if it is possible to obtain the respective desired effects by changing the application order in the respective regions. In particular, there is no problem when the user can designate the region of the special color area, and other regions including the normal color area, the data processing method, and the application order of fluorescent ink and clear ink can be changed.

Furthermore, this embodiment shows an example in which printing of each of fluorescent ink and clear ink is completed by one scan, but the present invention is not limited to this. It is also possible to print each of fluorescent ink and clear ink by a plurality of times of scan.

Fluorescent ink to be used in this embodiment has been explained by taking fluorescent pink ink as an example, but fluorescent ink is not limited to this. It is also possible to use, for example, fluorescent yellow ink, fluorescent green ink, or fluorescent orange ink.

Also, an example in which ink containing no colorant is used as clear ink has been explained. However, it is also possible to use ink containing a colorant whose amount is so small that its color cannot visually be recognized on a print medium.

Furthermore, an example in which the special color area is printed by using fluorescent pink ink alone has been explained, but the present invention is not limited to this. For example, the same effect can be obtained by performing printing by fluorescent orange by mixing fluorescent pink ink with yellow ink. Fluorescent pink ink can be printed as it is mixed with another color ink as the special color area.

Note that in the above-described example, the normal color area and the special color area are switched for each width of the head. However, a region to be printed by one scan can include both the normal color area and the special color area. In this case, whenever regions are changed, a mask need only be switched to a mask corresponding to the scanning direction and the region. The unit of switching can be nozzles required to express one pixel. For example, when three successive nozzles express the concentration of one pixel, masks can be switched by using the three nozzles corresponding to one pixel as a unit. Accordingly, even when the boundary between the special color area and the normal color area is not a straight line extending along the scanning line, an image can be printed by using fluorescent ink and clear ink in orders suitable for these regions.

Also, the RIP software 103 explained as it is executed by the PC 101 in FIG. 1 can be executed by the printing apparatus 104. Furthermore, the design software 102 can also be executed by the printing apparatus 104. Moreover, the PC 101 and the printing apparatus 104 can collectively be called a printing system.

Second Embodiment

In the first embodiment, an example in which one ejection nozzle array is prepared for clear ink and printing is performed by multipass scan (more specifically, 2-pass bidirectional scan) is explained as a means for changing the application order of fluorescent ink and clear ink. In the second embodiment, the setting of a special color area and a normal color area and the difference between data processing methods of these areas are the same as in the first embodiment. As a means for changing the application order of fluorescent ink and clear ink, an example in which two ejection nozzle arrays are prepared for clear ink and printing is performed by 1-path unidirectional scan will be explained.

Figure 15:
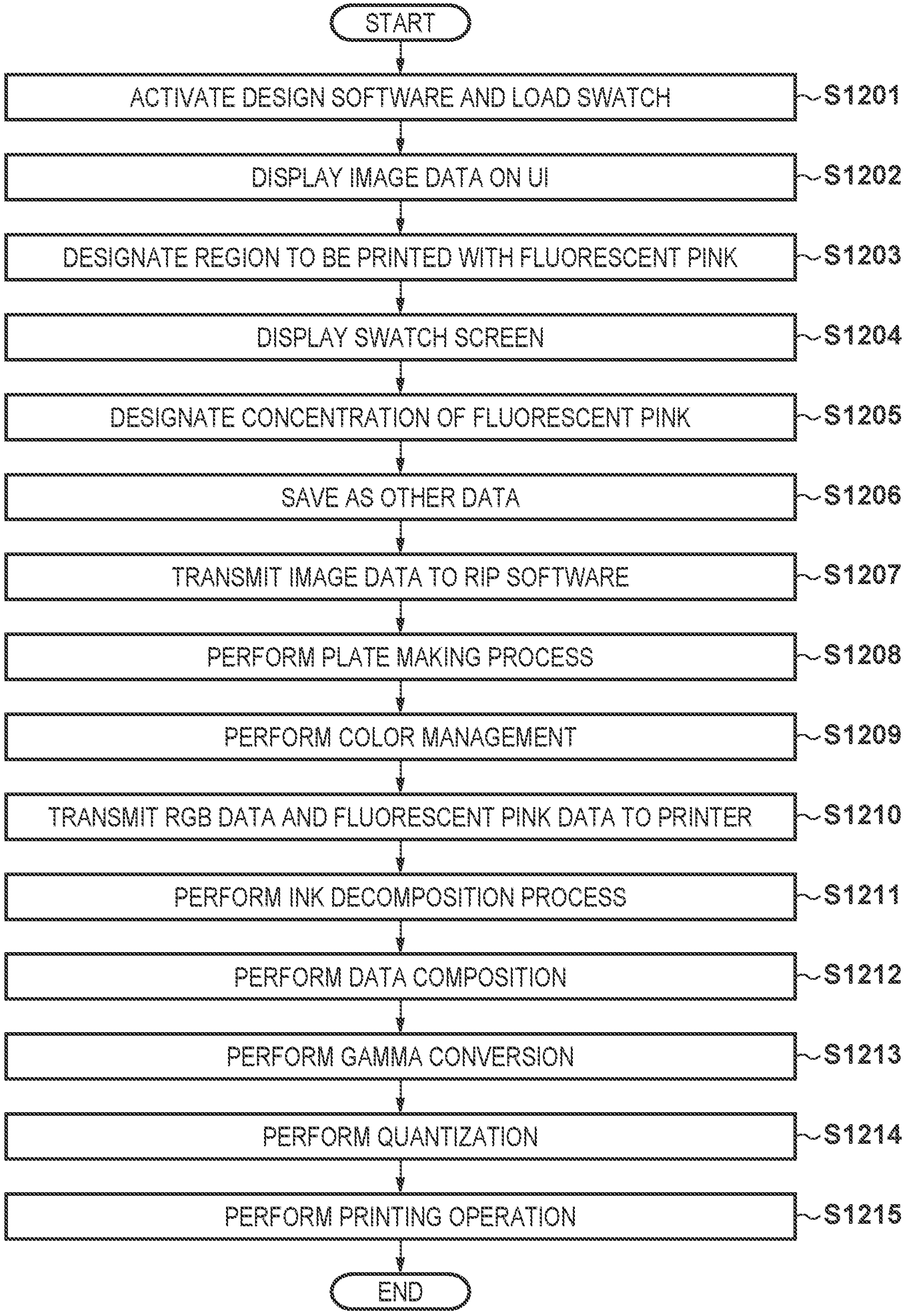
FIG. 15 is a view showing the configuration of a printing system.

FIG. 15 shows the procedure of an image editing/printing process using design software in a printing system of this embodiment. Processes in steps S1201 to S1214 are performed in the same manner as in steps S1101 to S1114 of the first embodiment. Based on dot data for controlling ON/OFF of ejection converted by a quantization processing unit 608, an image is printed by repeating printing scan and a conveyance operation and ejecting each ink from a printhead 405 (step S1215).

Figure 16:
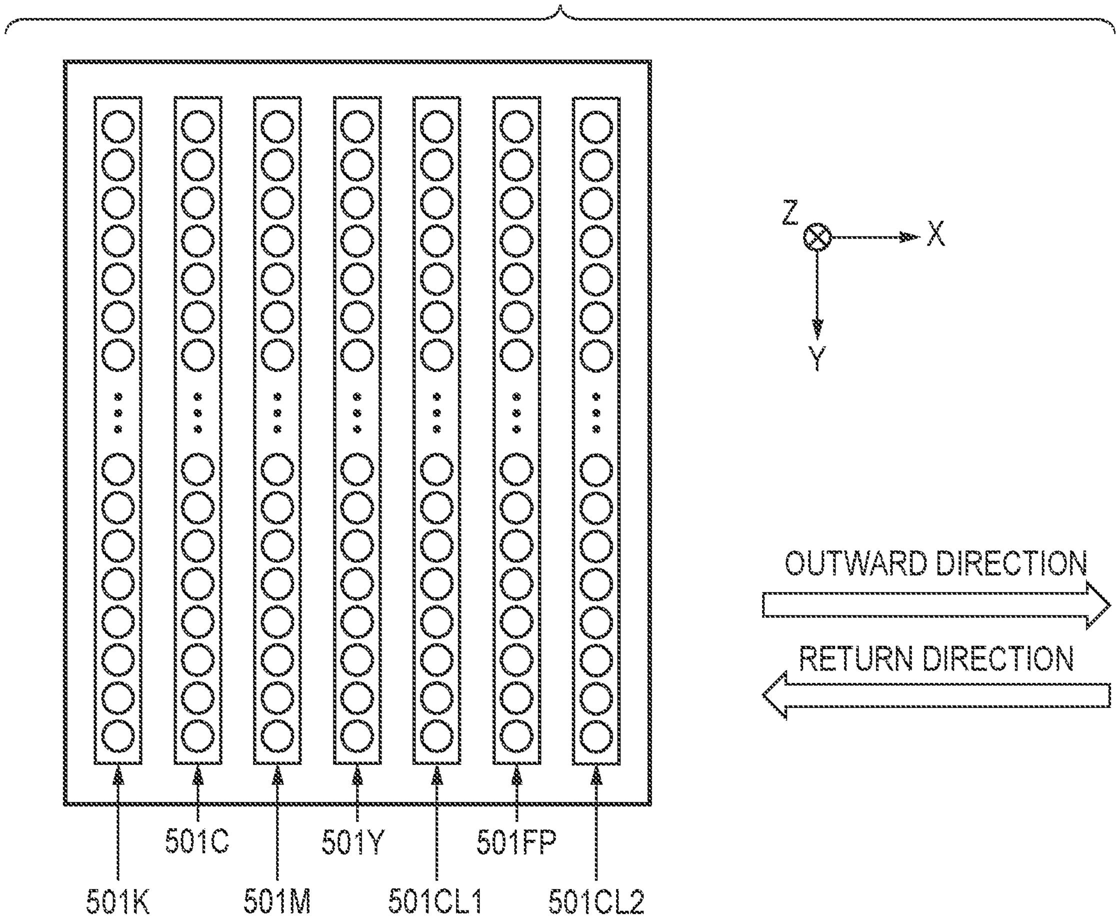
FIG. 16 is a view showing another example of the schematic view of the printhead.

The process of printing an image by ejecting ink from the printhead will be explained. FIG. 16 is a schematic view of the printhead to be used in the second embodiment. Compared to the printhead shown in FIG. 5B, two nozzle arrays for ejecting clear ink are prepared, and these two nozzle arrays for ejecting clear ink are so arranged as to sandwich a nozzle array for ejecting fluorescent ink. The nozzle arrays for ejecting clear ink are 501CL1 and 501CL2. A case where 1-pass unidirectional printing (ejection is performed in only the forward direction in FIG. 13) is performed by using this printhead will be explained. As shown in FIG. 16, when performing scan in the forward direction, the nozzle array 501CL2 precedes a nozzle array 501FP for fluorescent pink, and the nozzle array 501CL1 follows. This order is reversed when performing scan in the backward direction.

Ejection data generated in steps S1201 to S1214 described above are set for nozzle arrays of individual colors as follows.

Figure 17:
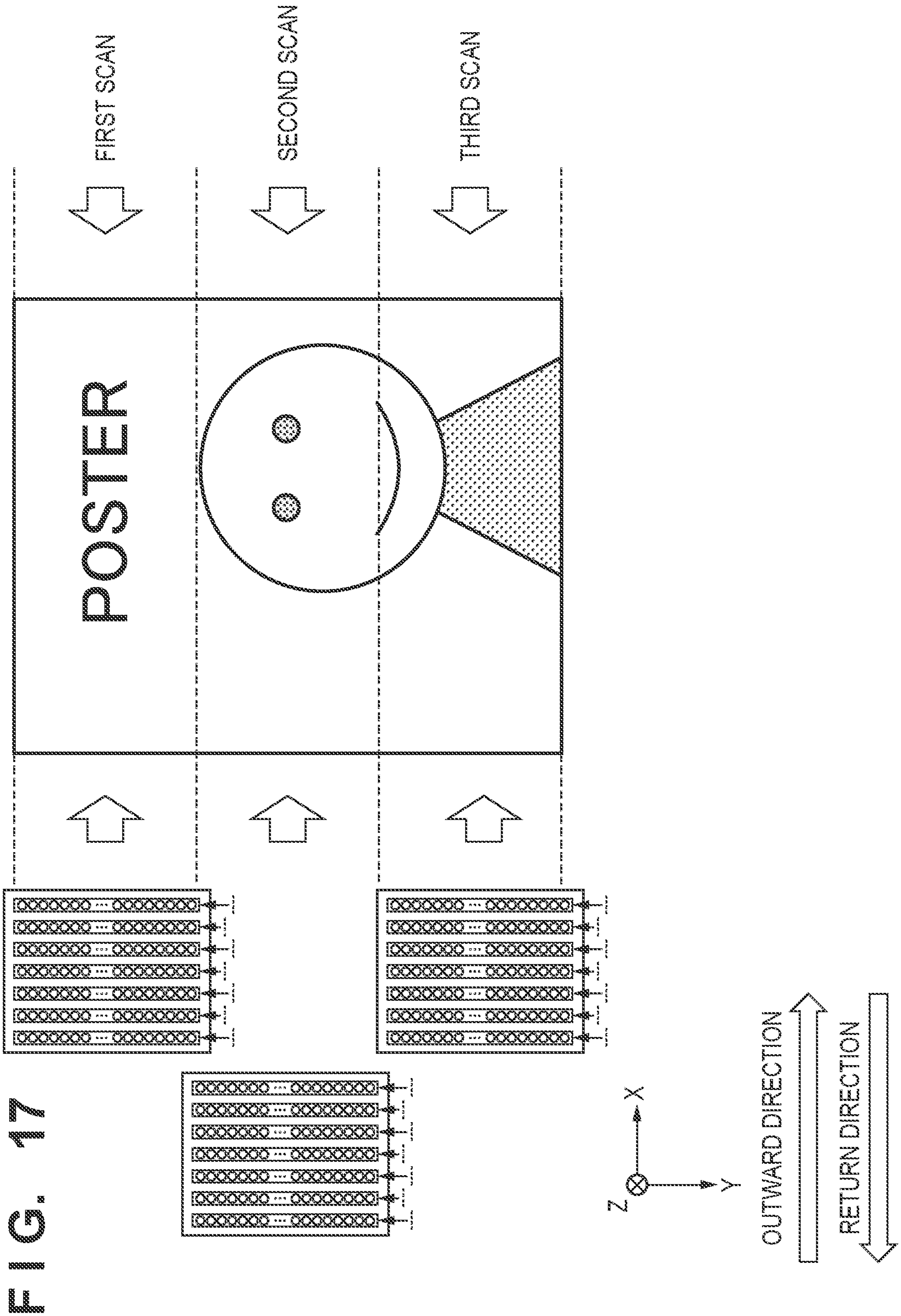
FIG. 17 is a view schematically showing the relative positional relationship between a printhead and a printed image.

Nozzle array 501C, cyan data
Nozzle array 501M, magenta data
Nozzle array 501Y, yellow data
Nozzle array 501K, black data
Nozzle array 501FP, fluorescent pink data
Nozzle array 501CL1, clear (normal color area) data
Nozzle array 501CL2, clear (special color area) data FIG. 17 is a view schematically showing the relative positional relationship between the printhead shown in FIG. 16 and the printed image shown in FIG. 12A. As shown in FIG. 17, printing is performed in a region including a special color area in which "POSTER" is written by text characters in the first scan, and printing is performed in a normal color area including "human face" from the second scan.

Next, the application order of fluorescent pink ink and clear ink in each scan will be explained. To simplify the explanation, only a fluorescent pink ink ejection portion and two clear ink ejection portions will be explained below.

In the first scan, the nozzle array 501CL2 ejects clear ink onto a print medium based on clear (special color area) data. After that, the nozzle array 501FP ejects fluorescent pink ink onto the print medium based on fluorescent pink data. In this case, the application order of fluorescent pink ink and clear ink is that clear ink is applied first and fluorescent pink ink is applied next, so clear ink forms a lower layer on the print medium. As the time difference between pink ink and clear ink, the scanning velocity was made lower than that of normal printing so that the time difference was 1.0 sec as described previously. When the first scan is complete, the printhead is returned once, and the print medium is relatively moved by the nozzle array length in the conveyance direction.

In the second scan, the nozzle array 501FP ejects fluorescent pink ink onto the print medium based on fluorescent pink data. After that, the nozzle array 501CL1 ejects clear ink onto the print medium based on clear (normal color area) data corresponding to the fluorescent pink data contained in the normal color area. At this time, the application order of fluorescent pink ink and clear ink is that fluorescent ink is applied first and clear ink is applied next, so clear ink forms an upper layer on the print medium. Printing of the image data is completed by similarly performing the third scan.

Note that the arrangement in which the two clear ink printheads sandwich the one fluorescent pink ink printhead is explained with reference to FIG. 16. However, two fluorescent pink ink printheads can sandwich one clear ink printhead. In this case, the printing order must be reversed from that of the abovementioned example. That is, only one of the two fluorescent pink ink printheads is used in accordance with the decided printing order.

In the printing unit of this embodiment as described above, two printheads are prepared for clear ink or fluorescent pink ink, and the printhead of the other ink is placed between them. Assuming that these printheads are the first, second, and third printheads, the first and third printheads are printheads for the same color, and the second printhead is a printhead for a color different from that. Assuming that the first and second printheads form a first printhead pair and the second and third printheads form a second printhead pair, the color orders of printheads in the first and second printhead pairs are different. That is, regardless of whether clear ink or fluorescent pink ink is printed first, a printhead pair corresponding to the order exists. Therefore, an image is formed by using a printhead pair corresponding to the printing order of clear ink or fluorescent pink ink.

In this embodiment, as in the first embodiment, the chroma of the special color area in which "POSTER" is written by text characters can be improved because clear ink forms a lower layer on the print medium. Also, the emission intensity of the normal color area including "human face" can be improved because clear ink forms an upper layer on the print medium. Accordingly, it is possible to improve the chroma in the special color area and the emission intensity in the normal color area, that is, to obtain the effects to be obtained in the respective regions.

In addition, this embodiment is also applicable to a line system that forms an image while conveying a print medium by a line head having a width exceeding the print medium. In this case, two printheads are prepared for clear ink or fluorescent pink ink, and a printhead of the other color is sandwiched between them. Since the line system performs scan by conveying a print medium, it is difficult to scan the same region a plurality of times unlike in the serial system. Therefore, the configuration and control of this embodiment are suitable for the line system, and the above-described effects can be achieved.

Furthermore, in the printhead shown in FIG. 16, the nozzle array 501FP of fluorescent pink ink sandwiched between the nozzle arrays 501CL1 and 501CL2 of clear ink is arranged adjacent to them, but can also be spaced apart from them by sandwiching ink of another color. Consequently, the printing time can have an interval by a time equivalent to the space.

Third Embodiment

Figure 18:
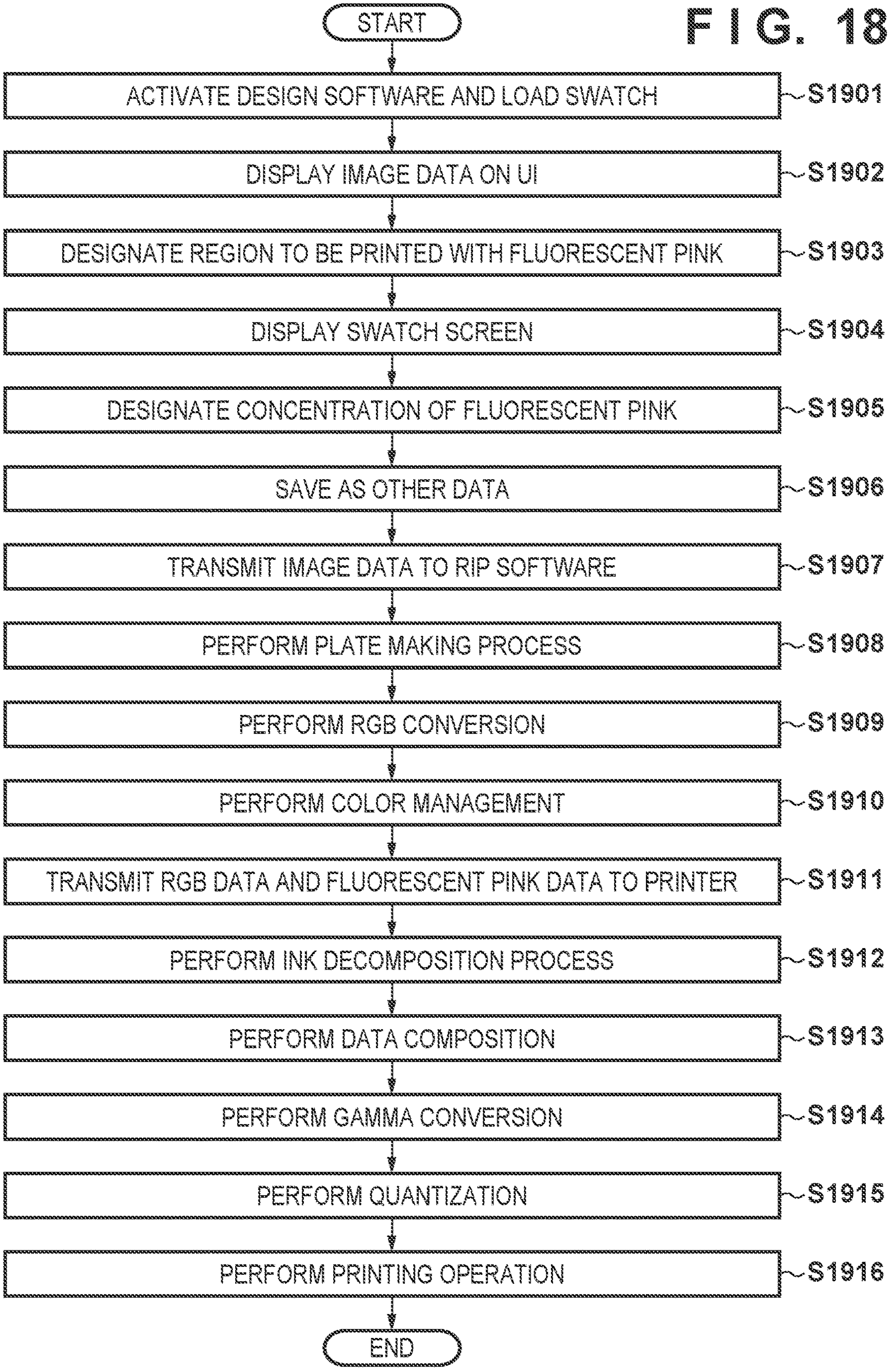
FIG. 18 is a view showing the configuration of a printing system.

In the second embodiment, an example in which RGB data is processed as an input image has been explained. In the third embodiment, an example in which CMYK data is processed as an input image will be explained. More specifically, a printing process is performed in accordance with the processing blocks shown in FIG. 6B. FIG. 18 show the procedure of an image editing/printing process using design software in a printing system of this embodiment.

Processes in steps S1901 to S1908 are performed in the same manner as in steps S1101 to S1108 of the first embodiment. In step S1908, RGB data is replaced with CMYK data in the same manner as in step S1108.

Then, an RGB conversion process is performed on the CMYK data having undergone a plate making process until step S1908 (step S1909). An RGB conversion processing unit 611 performs an RGB conversion process on CMYK data 610 having undergone the plate making process. Consequently, a color shown in a CMYK color space is shown in an RGB color space. The RGB conversion processing unit 611 is generally a means for performing conversion by using a lookup table, but is not limited to that. For example, conversion can also be performed by using an equation. In steps S1910 to S1916, the same processes as in steps S1109 to S1115 of the first embodiment are performed.

As a consequence, it is possible to improve the chroma in a special color area and the emission intensity in a normal color area, that is, to obtain the effects to be obtained in the respective regions.

Note that an image can also be formed in the same manner as in the second embodiment by using the printing apparatus 104 of the second embodiment. Consequently, the same effects as those of the second embodiment can be obtained.

Fourth Embodiment

In the first to third embodiments, an example in which a region designated by the user is set as a special color area and data processing different from that in a normal color area is performed in the special color area has been explained. In addition, an example in which control is so performed as to use different application orders of fluorescent pink ink and clear ink in the special color area and the normal color area has been explained.

In the fourth embodiment, a method of separating image regions inside an image transmitted as the same image plane and giving attributes to the image regions, thereby separately performing printing in a special color area and a normal color area will be explained. More specifically, an example in which an image acquiring means obtains an image to be printed and the acquired image is separated in accordance with the area ratio of the same pixel value within the image will be explained below. In addition, a region where the area ratio of the same pixel value is equal to or larger than a predetermined value is regarded as a first region (special color area), and a region where this area ratio is smaller than the predetermined value is regarded as a second region. In this embodiment, design software 102, RIP software 103, and a printing apparatus 104 are configured as shown in FIG. 6A.

Figure 19:
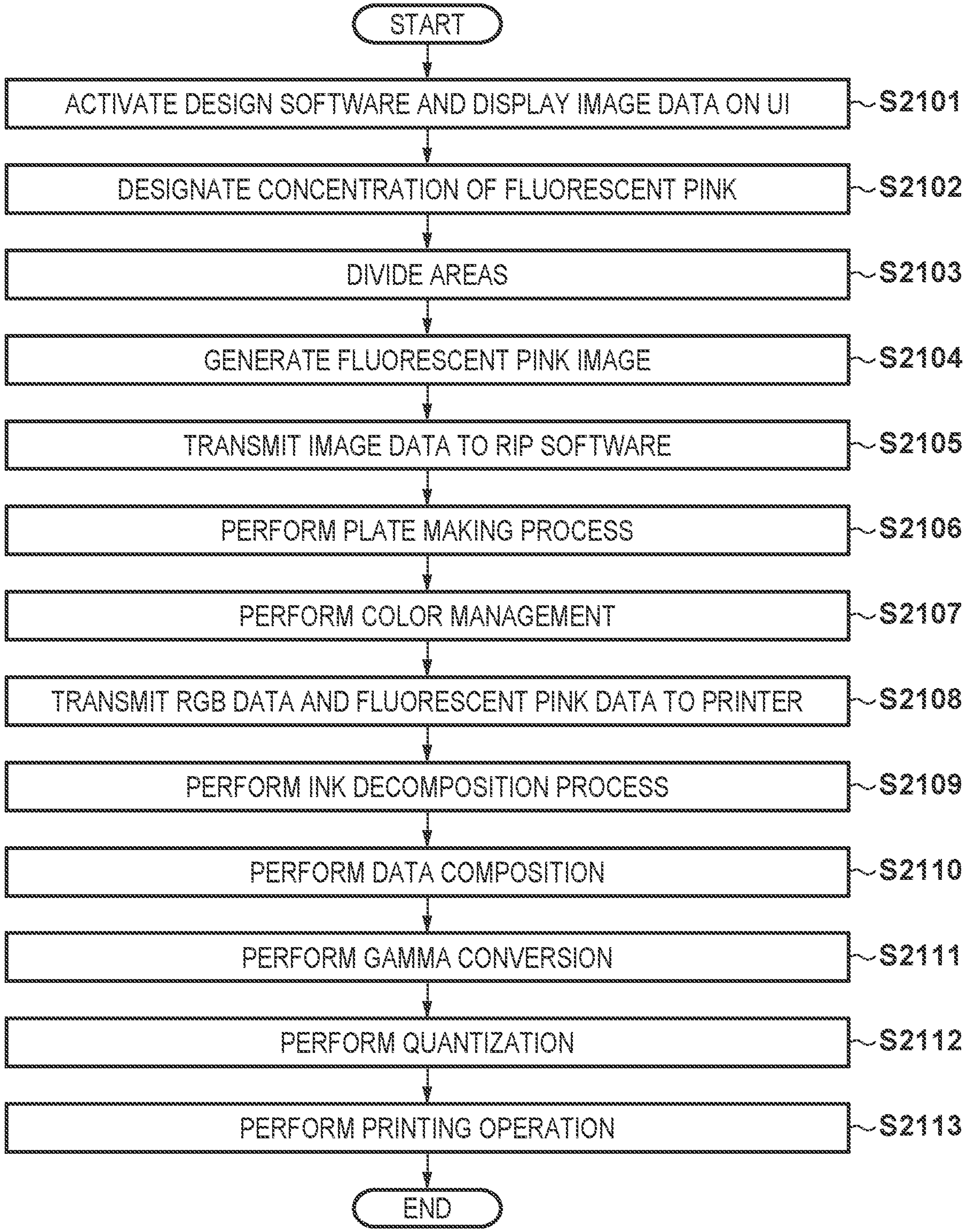
FIG. 19 is a view showing the procedure of an image editing/printing process using design software.

FIG. 19 shows the procedure of an image editing/printing process using the design software in this embodiment. In this image editing/printing process shown in FIG. 19, a PC 101 as an image processing apparatus causes the design software 102 to automatically divide an image region into a special color area and a normal color area, and transmit the formed image data to the RIP software 103. Processing after that is the same as in the first embodiment.

First, the design software 102 shown in FIG. 2 is activated in accordance with a user's operation, and image data to be printed is displayed on the UI. In this embodiment, as shown in FIG. 12A, a color image having 8 bits for each of R, G, and B is used as the image data (step S2101). Then, the user designates a color or concentration to be printed by fluorescent pink displayed on the UI (step S2102).

Subsequently, a processing button (not shown) or processing command for region division is executed on the design software, thereby dividing the image into a special color area and a normal color area (S2103). In this step, it is determined that a region where the area ratio of the same pixel value per unit area region is equal to or larger than a predetermined value is a special color area. In this embodiment, a region where the ratio of pixels having the same pixel value to a predetermined number of pixels, for example, 100 pixels is 0.8 or more is regarded as a special color area. Note that in order to prevent a blank space from being regarded as a special color area, a white region where all the concentration values of individual colors are 0 (paper white) need not be regarded as a special color area, even when the abovementioned condition is met. On the other hand, it is determined that a region where the area ratio of the same pixel value is smaller than the predetermined value is a normal color area. Similarly, in this embodiment, a region where the area ratio of the same pixel value to arbitrary 100 pixels is less than 0.2 is regarded as a normal color area. Note that it is also possible to determine that a region that is not regarded as a special color area is a normal color area.

Subsequently, attribute information indicating a special color area is given to the special color area. Attribute information indicating a text region and attribute information indicating a non-text region are given to the image shown in FIG. 12A in advance. In a region where six text characters "POSTER" are written on the image, the area ratio of the same pixel value is 0.8 or more, so this region is regarded as a special color area and separated from other regions. Consequently, the region of the six text characters "POSTER" is set as a special color area (step S2103).

Then, the design software 102 saves the region set as the special color area as fluorescent pink data (step S2104). After that, processing in steps S2105 to S2113 is performed as the same processing in steps S1107 to S1115 in the first embodiment.

As a consequence, it is possible to improve the chroma in the special color area and the emission intensity in the normal color area, that is, to obtain the effects to be obtained in the respective regions, as in the other embodiments.

As described above, it is possible to obtain the effect of increasing the chroma in the special color area by printing a clear ink image first and then printing a fluorescent ink image, and the effect of increasing the emission intensity in the normal color area by printing a fluorescent ink image first and then printing a clear ink image. Accordingly, when a color image, particularly an image using clear ink and fluorescent ink is printed in the abovementioned printing order, more desirably, at a printing interval of 1.0 sec or more, the same effects as those of the abovementioned four embodiments can be obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-047349, filed Mar. 23, 2022 which is hereby incorporated by reference herein in its entirety.

What is claimed is:

1. A printing apparatus comprising:

a printing unit including a first printing portion configured to print an image by a fluorescent coloring material, and a second printing portion configured to print an image by a second coloring material that is not colored; and a controller configured to control printing of an image onto a print medium performed by the first printing portion, and printing of an image onto the print medium performed by the second printing portion, wherein the controller controls an order of the printing by the first printing portion and the printing by the second printing portion, in accordance with an attribute of a region of an image as a printing target.

2. The apparatus according to claim 1, wherein the controller further performs control such that a time difference between the printing by the first printing portion and the printing by the second printing portion is not less than a predetermined time.

3. The apparatus according to claim 1, wherein the controller controls the printing order such that the printing of an image by the first printing portion is performed first if the attribute indicates that a chroma is to be improved in the region, and the printing of an image by the second printing portion is performed first if the attribute indicates that an emission intensity is to be improved in the region.

4. The apparatus according to claim 1, wherein the printing unit forms an image by a serial method while scanning the print medium by a carriage on which the first printing portion and the second printing portion are mounted, and the controller controls the printing order by performing the printing by the first printing portion in one of a forward scan and a backward scan of the scan, and performing the printing by the second printing portion in the other of the forward scan and the backward scan without conveying the print medium.

5. The apparatus according to claim 1, wherein the printing unit forms an image by a serial method while scanning the print medium by a carriage on which a third printing portion configured to print an image by the fluorescent coloring material or the second coloring material is mounted in addition to the first printing portion and the second printing portion, one of the first printing portion to the third printing portion is mounted on the carriage such that two printing portions for forming an image by one of the fluorescent coloring material and the second coloring material sandwiches a printing portion for forming an image by the other coloring material, and the controller controls, during the scan, the printing order by using one of a pair of the first printing portion and the second printing portion, and a pair of the third printing portion and one of the first printing portion and the second printing portion, which forms an image by a coloring material different from that of the third printing portion.

6. The apparatus according to claim 1, wherein image data to be printed by the fluorescent coloring material is accepted by different scans corresponding to the attributes, and the apparatus further comprises a unit configured to generate image data to be printed by the second coloring material in accordance with the image data to be printed by the fluorescent coloring material, and give the attribute corresponding to the scan to the image data to be printed by the second coloring material.

7. The apparatus according to claim 1, wherein the print medium has a layer for absorbing ink on a surface, and the layer has pores smaller than a size of the resin particles contained in the fluorescent coloring material, and larger than a size of the resin particles contained in the second coloring material.

8. The apparatus according to claim 1, wherein the fluorescent coloring material is fluorescent color ink and the second coloring material is transparent ink, the printing unit forms an image on the print medium by ejecting the ink from each printing portion, and the controller switches the printing portions for ejecting the ink in accordance with the attributes.

9. The apparatus according to claim 1, wherein the second coloring material further contains a solvent for redissolving at least the fluorescent coloring material.

10. The apparatus according to claim 1, wherein the fluorescent coloring material contains resin particles dyed by a fluorescent dye.

11. The apparatus according to claim 1, wherein the second coloring material contains at least a resin.

12. A control method of a printing apparatus comprising a printing unit including a first printing portion configured to print an image by a fluorescent coloring material, and a second printing portion configured to print an image by a second coloring material that is not colored, and a controller, the method comprising:

controlling printing of an image onto a print medium performed by the first printing portion, and printing of an image onto the print medium performed by the second printing portion, wherein an order of the printing by the first printing portion and the printing by the second printing portion is controlled in accordance with an attribute of a region of an image as a printing target.

* * * * *